United States Patent
Lo et al.

(10) Patent No.: US 12,526,220 B2
(45) Date of Patent: Jan. 13, 2026

(54) METHOD AND APPARATUS FOR CHANNEL ENVIRONMENT CLASSIFICATION

(71) Applicant: Samsung Electronics Co., Ltd., Suwon-si (KR)

(72) Inventors: Caleb K. Lo, San Jose, CA (US);
Jeongho Jeon, San Jose, CA (US);
Haichuan Ding, Casselberry, FL (US);
Joonyoung Cho, Portland, OR (US);
Pranav Madadi, Sunnyvale, CA (US);
Qiaoyang Ye, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 622 days.

(21) Appl. No.: 17/806,716

(22) Filed: Jun. 13, 2022

(65) Prior Publication Data

US 2023/0006913 A1   Jan. 5, 2023

Related U.S. Application Data

(60) Provisional application No. 63/244,083, filed on Sep. 14, 2021, provisional application No. 63/215,796, filed on Jun. 28, 2021.

(51) Int. Cl.
*H04L 43/55* (2022.01)
*H04B 17/309* (2015.01)
(Continued)

(52) U.S. Cl.
CPC ........... *H04L 43/55* (2022.05); *H04B 17/309* (2015.01); *H04L 43/0864* (2013.01); *H04W 24/10* (2013.01)

(58) Field of Classification Search
USPC ....... 370/229, 236, 241, 252, 328, 329, 331, 370/332
See application file for complete search history.

(56) References Cited

U.S. PATENT DOCUMENTS

2017/0238289 A1   8/2017   Zhang et al.
2018/0367192 A1*  12/2018  O'Shea ............... H04B 7/0452
(Continued)

FOREIGN PATENT DOCUMENTS

WO   2021086369 A1   5/2021

OTHER PUBLICATIONS

"3rd Generation Partnership Project; Technical Specification Group Radio Access Network; NR; Multiplexing and channel coding (Release 17)", 3GPP TS 38.212 V17.1.0, Mar. 2022, 197 pages.
(Continued)

*Primary Examiner* — Nguyen H Ngo

(57) ABSTRACT

UE capability for support of machine-learning (ML) based channel environment classification may be reported by a user equipment to a base station, where the channel environment classification classifies a channel environment of a channel between the UE and a base station based on one or more of UE speed or Doppler spread, UE trajectory, frequency selectivity or delay spread, coherence bandwidth, coherence time, radio resource management (RRM) metrics, block error rate, throughput, or UE acceleration. The user equipment may receive configuration for ML based channel environment classification, including at least enabling/disabling of ML based channel environment classification. When ML based channel environment classification is enabled, UE assistance information for ML based channel environment classification, and/or an indication of the channel environment (which may be a pre-defined channel environment associated with a lookup table), may be transmitted by the user equipment to the base station.

14 Claims, 15 Drawing Sheets

(51) Int. Cl.
*H04L 43/0864* (2022.01)
*H04W 24/10* (2009.01)

(56) References Cited

U.S. PATENT DOCUMENTS

| | | |
|---|---|---|
| 2019/0166505 A1 | 5/2019 | Zhao et al. |
| 2019/0215207 A1 | 7/2019 | Kang et al. |
| 2020/0336922 A1 | 10/2020 | Zhao et al. |
| 2020/0366326 A1* | 11/2020 | Jassal .................. G06N 3/08 |
| 2021/0160149 A1 | 5/2021 | Ma et al. |
| 2021/0211152 A1* | 7/2021 | Kenney ............... G01S 13/878 |
| 2021/0297178 A1* | 9/2021 | Kim ..................... H04L 5/0055 |
| 2021/0409086 A1* | 12/2021 | Yerramalli ........... H04W 72/23 |
| 2022/0131588 A1* | 4/2022 | Elshafie .............. H04B 7/0626 |
| 2022/0400373 A1* | 12/2022 | Zhu ..................... G06N 3/04 |
| 2023/0120578 A1* | 4/2023 | Khoshnevisan ...... H04L 1/0027 370/329 |

OTHER PUBLICATIONS

"3rd Generation Partnership Project; Technical Specification Group Radio Access Network; NR; Physical layer procedures for data (Release 17)", 3GPP TS 38.214 V17.1.0, Mar. 2022, 225 pages.
"3rd Generation Partnership Project; Technical Specification Group Radio Access Network; NR; Radio Resource Control (RRC) protocol specification (Release 17)", 3GPP TS 38.331 V17.0.0, Mar. 2022, 1221 pages.
"3rd Generation Partnership Project; Technical Specification Group Radio Access Network; NR; Physical channels and modulation (Release 17)", 3GPP TS 38.211 V17.1.0, Mar. 2022, 135 pages.
Extended European Search Report issued Jul. 10, 2024 regarding Application No. 22833510.5, 9 pages.
International Search Report and Written Opinion issued Oct. 7, 2022 regarding International Application No. PCT/KR2022/008995, 8 pages.

* cited by examiner

METHOD AND APPARATUS FOR CHANNEL ENVIRONMENT CLASSIFICATION

CROSS-REFERENCE TO RELATED APPLICATION AND CLAIM OF PRIORITY

This application claims priority to U.S. Provisional Patent Application No. 63/215,796 filed Jun. 28, 2021, and U.S. Provisional Patent Application No. 63/244,083 filed Sep. 14, 2021. The content of the above-identified patent documents is incorporated herein by reference.

TECHNICAL FIELD

The present disclosure relates generally to use of channel environment classification in wireless communications, and more specifically to channel environment classification in terms of one or more of user equipment speed (e.g., Doppler spread), frequency selectivity (e.g., delay spread), or coherence bandwidth and/or coherence time.

BACKGROUND

To meet the demand for wireless data traffic having increased since deployment of 4th Generation (4G) or Long Term Evolution (LTE) communication systems and to enable various vertical applications, efforts have been made to develop and deploy an improved 5$^{th}$ Generation (5G) and/or New Radio (NR) or pre-5G/NR communication system. Therefore, the 5G/NR or pre-5G/NR communication system is also called a "beyond 4G network" or a "post LTE system." The 5G/NR communication system is considered to be implemented in higher frequency (mmWave) bands, e.g., 28 giga-Hertz (GHz) or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and technologies associated therewith is for reference as certain embodiments of the present disclosure may be implemented in 5G systems, 6$^{th}$ Generation (6G) systems, or even later releases which may use terahertz (THz) bands. However, the present disclosure is not limited to any particular class of systems or the frequency bands associated therewith, and embodiments of the present disclosure may be utilized in connection with any frequency band. For example, aspects of the present disclosure may also be applied to deployment of 5G communication systems, 6G communications systems, or communications using THz bands.

SUMMARY

UE capability for support of machine-learning (ML) based channel environment classification may be reported by a user equipment to a base station, where the channel environment classification classifies a channel environment of a channel between the UE and a base station based on one or more of UE speed or Doppler spread, UE trajectory, frequency selectivity or delay spread, coherence bandwidth, coherence time, radio resource management (RRM) metrics, block error rate, throughput, or UE acceleration. The user equipment may receive configuration for ML based channel environment classification, including at least enabling/disabling of ML based channel environment classification. When ML based channel environment classification is enabled, UE assistance information for ML based channel environment classification, and/or an indication of the channel environment (which may be a pre-defined channel environment associated with a lookup table), may be transmitted by the user equipment to the base station.

In one embodiment, a user equipment (UE) includes a processor and a transceiver operatively coupled to the processor. The transceiver is configured to transmit a report of UE capability for support of machine-learning (ML) based channel environment classification, where the channel environment classification classifies a channel environment of a channel between the UE and a base station based on one or more of UE speed or Doppler spread, UE trajectory, frequency selectivity or delay spread, coherence bandwidth, coherence time, radio resource management (RRM) metrics, block error rate, throughput, or UE acceleration. The transceiver is configured to receive configuration for ML based channel environment classification, the configuration for ML based channel environment classification comprising at least enabling/disabling of ML based channel environment classification. When ML based channel environment classification is enabled, the transceiver is configured to one of transmit UE assistance information for ML based channel environment classification, or transmit an indication of the channel environment.

In a second embodiment, a method performed by a user equipment (UE) includes transmitting a report of UE capability for support of machine-learning (ML) based channel environment classification, where the channel environment classification classifies a channel environment of a channel between the UE and a base station based on one or more of UE speed or Doppler spread, UE trajectory, frequency selectivity or delay spread, coherence bandwidth, coherence time, radio resource management (RRM) metrics, block error rate, throughput, or UE acceleration. The method also includes receiving configuration for ML based channel environment classification, the configuration for ML based channel environment classification comprising at least enabling/disabling of ML based channel environment classification. When ML based channel environment classification is enabled, the method further includes one of transmitting UE assistance information for ML based channel environment classification, or transmitting an indication of channel environment.

In another embodiment, a base station includes a processor and a transceiver operatively coupled to the processor. The transceiver is configured to receive a report of user equipment (UE) capability for support of machine-learning (ML) based channel environment classification, where the channel environment classification classifies a channel environment of a channel between the UE and a base station based on one or more of UE speed or Doppler spread, UE trajectory, frequency selectivity or delay spread, coherence bandwidth, coherence time, radio resource management (RRM) metrics, block error rate, throughput, or UE acceleration. The transceiver is also configured to transmit configuration for ML based channel environment classification, the configuration for ML based channel environment classification comprising at least enabling/disabling of ML based channel environment classification. When ML based channel environment classification is enabled, either the processor is configured to perform model training based on the configuration and a received information on channel environment determined by the UE, or the transceiver is configured to receive UE assistance information for ML based channel classification. The transceiver is further configured to receive an indication of the channel environment.

In any of the forgoing embodiments, the indication of the channel environment may be a pre-defined channel environment associated with a lookup table.

In any of the forgoing embodiments, the configuration for ML based channel environment classification further may comprise one or more of a format for the indication, resources for the indication, periodicity of the indication, ML model to be used, updated ML model parameters, or whether model parameters received from the UE will be used.

In any of the forgoing embodiments, the UE assistance information may comprise one of: an indication of one or more of UE speed, frequency selectivity, channel coherence time, channel coherence bandwidth, UE trajectory, radio resource management (RRM) metrics, block error rate, throughput, or UE acceleration; or an indication usable for performing model inference or includes model inference result if the UE performs model inference, wherein the model inference result further comprises one or more of an indication of a channel environment, a recommendation for a transmission mode, or a recommendation for BS handover.

In any of the forgoing embodiments, the UE assistance information may comprise one of: periodic and triggered by UE-specific radio resource control (RRC) signaling; or aperiodic or semi-persistent and triggered by a downlink control information (DCI).

In any of the forgoing embodiments, the configuration for ML based channel environment classification may be one of: broadcast as part of system information; or transmitted via UE-specific signaling.

In any of the forgoing embodiments, the configuration for ML based channel environment classification may include enabling/disabling of channel environment-aware feedback, and wherein the transceiver is configured to transmit channel state information (CSI) reporting indicating channel environment when channel environment-aware feedback is enabled.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. Likewise, the term "set" means one or more. Accordingly, a set of items can be a single item or a collection of two or more items.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIGS. 8A and 8B depict the configuration of the AI/ML encoder, with FIG. 8A depicting the overall architecture of a circular buffer aided AI/ML encoder, while FIG. 8B depicts the overall architecture of the kth neural network therein;

DETAILED DESCRIPTION

Figure 1:
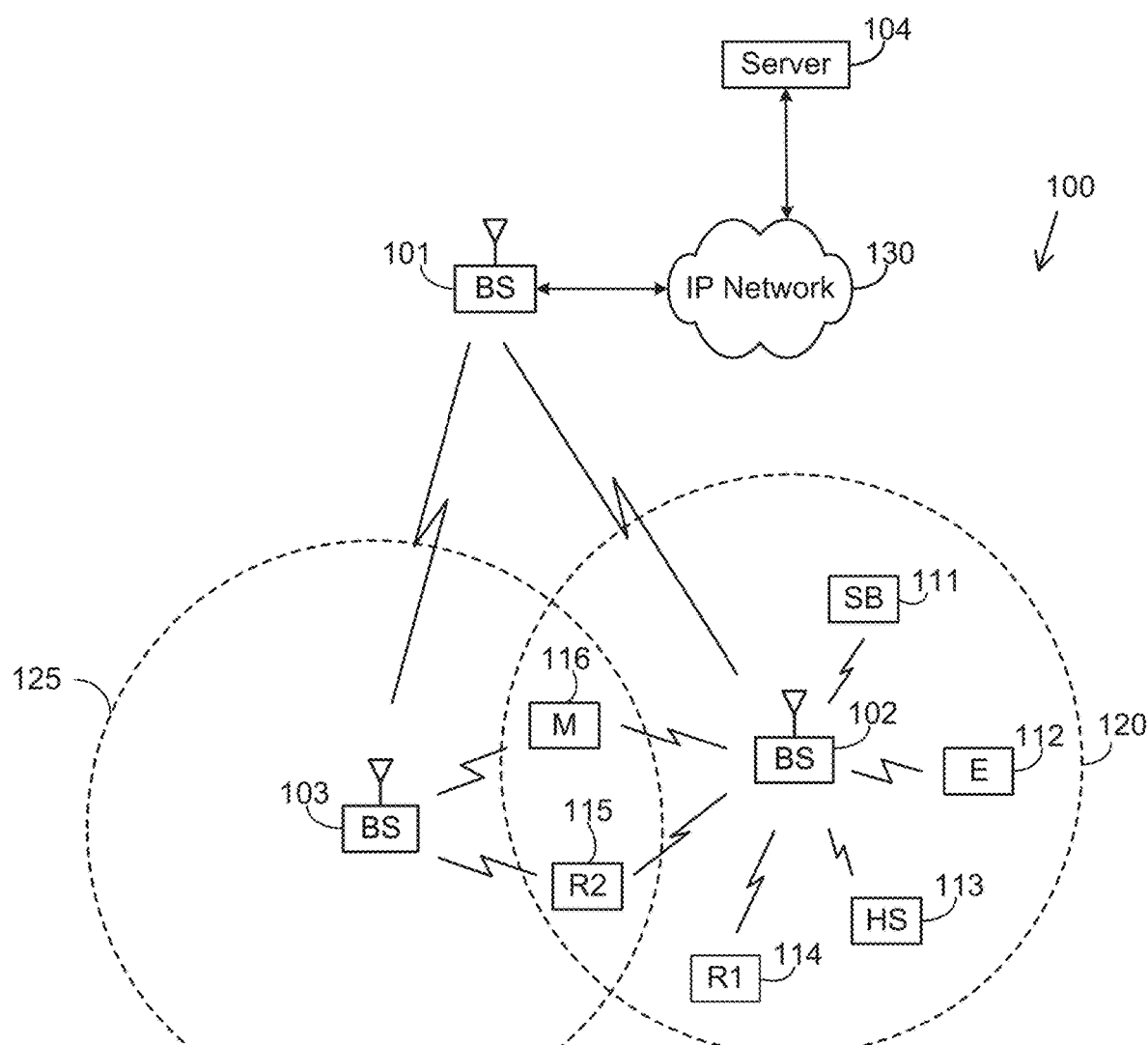
FIG. 1 illustrates an exemplary networked system utilizing one of input circular buffer aided artificial intelligence or machine learning or channel environment classification according to various embodiments of this disclosure.

The figures included herein, and the various embodiments used to describe the principles of the present disclosure are by way of illustration only and should not be construed in any way to limit the scope of the disclosure. Further, those skilled in the art will understand that the principles of the present disclosure may be implemented in any suitably arranged wireless communication system.

REFERENCES

[1] 3GPP, TS 38.212, 5G; NR; Multiplexing and channel coding

[2] 3GPP TS 38.214, 5g; NR; Physical layer procedures for data

[3] 3GPP, TS 38.331, 5G; NR; Radio Resource Control (RRC); Protocol specification.

[4] 3GPP, TS 38.211, 5G; NR; Physical channels and modulation.

The above-identified references are incorporated herein by reference.

ABBREVIATIONS

ML Machine Learning
AI Artificial Intelligence
gNB Base Station (Next Generation NodeB)
UE User Equipment
NR New Radio
3GPP 3rd Generation Partnership Project
SIB System Information Block
DCI Downlink Control Information
UCI Uplink Control Information
PDCCH Physical Downlink Control Channel
PDSCH Physical Downlink Shared Channel
PUSCH Physical Uplink Shared Channel
PUCCH Physical Uplink Control Channel
RRC Radio Resource Control
DL Downlink
UL Uplink
LTE Long-Term Evolution
BWP Bandwidth Part
MAC-CE Medium Access Control—Control Element
SNR Signal to Noise Ratio
TBS Transport Block Size
BER Bit Error Rate
BLER Block Error Rate
BS Base Station
CE Control Element
CSI Channel State Information
FDD Frequency Division Duplex
IE Information Element
MAC Medium Access Control
OFDM Orthogonal Frequency Division Multiplexing
RAN Radio Access Network
O-RAN Open Radio Access Network
RRC Radio Resource Control
RRM Radio Resource Management
RS Reference Signal
TM Transmission Mode Channel coding is at the core of modern communication systems. Over the past few decades, the innovations in channel coding are powered by the mathematical insights of information theory and human ingenuity. The fifth generation communication system is expected to support various services with diverse requirements in throughput, delay, and reliability, and impose difference constraints, such as decoding complexity, reliability, and adaptability, on channel coding schemes. These newly emerging requirements will make existing handcrafted coding schemes, such as Turbo codes and LDPC codes, suboptimal as they are able to operate close to the Shannon limit only in some regimes (e.g., at long block length and additive white Gaussian Noise).

AI/ML based channel codes, where the information bits are sequentially processed, have demonstrated great potentials to meet these challenges. Because of such sequential processing, the coded bits output by these AI/ML encoders will depend on both the information bits currently input to the encoder and the previously input information bits "memorized" by these AI/ML encoders.

Due to the memory of these AI/ML encoder, the information bits located at the end of the input block will be encoded in a smaller number of coded bits in comparison to those bits located at the beginning of the input block. This will lead to unequal error protection of the input information bits, which can adversely affect system performance, particularly when the most important bits are located at the end of the input block. One solution to this problem is to add padding bit to the end of the input block. However, such padding operation will inevitably lead to a reduction in code rate, especially with a small input block length (e.g., in the Ultra-Reliable Low Latency Communication (URLLC)).

The present disclosure describes a circular buffer aided AI/ML based channel coding scheme to address the problem of unequal error protection in AI/ML based channel codes without reducing the code rate. The overall framework to support this input circular buffer aided AI/ML techniques for channel coding operations in wireless communication systems and corresponding signaling details are also discussed in this disclosure.

Communication over a randomly-varying wireless channel is subject to various impairments. For example, the speed of a mobile UE determines the Doppler spread for a transmitted signal; thus, the channel induces variations in the received signal quality over time. Also, mobility of a UE and/or reflectors affects the delay spread for a transmitted signal; in this case, the channel induces variations in the received signal quality over frequency.

It may be advantageous to determine the statistics of the underlying randomly-varying wireless channel. For example, if the channel is varying rapidly in time, then a lower CSI estimation error can be obtained by utilizing an RS pattern that places RS on every other OFDM symbol, compared to an RS pattern that only places RS on the first OFDM symbol in a subframe. As another example, if the channel is varying slowly in time and frequency, then a larger throughput can be obtained by utilizing a TM that corresponds to spatial multiplexing, compared to a TM that corresponds to transmit diversity.

The details of the algorithm for determining the statistics of the underlying randomly-varying wireless channel are typically left to the network.

The present disclosure describes a framework for supporting AI/ML techniques for channel environment classification based on determining the statistics of the underlying randomly-varying wireless channel. The corresponding signaling details are discussed in this disclosure.

FIG. 1 illustrates an exemplary networked system utilizing one of input circular buffer aided artificial intelligence or machine learning or channel environment classification according to various embodiments of this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a base station (BS) 101, a BS 102, and a BS 103. The BS 101 communicates with the BS 102 and the BS 103. The BS 101 also communicates with at least one Internet protocol (IP) network 130, such as the Internet, a proprietary IP network, or another data network.

The BS 102 provides wireless broadband access to the network 130 for a first plurality of user equipments (UEs) within a coverage area 120 of the BS 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R1); a UE 115, which may be located in a second residence (R2); and a UE 116, which may be a mobile device (M) like a cell phone, a wireless laptop, a wireless PDA, or the like. The BS 103 provides wireless broadband access to the network 130 for a second plurality of UEs within a coverage area 125 of the BS 103. The second plurality of UEs includes the UE 115 and the UE 116. In some embodiments, one or more of the BSs 101-103 may communicate with each other and with the UEs 111-116 using 5G, LTE, LTE Advanced (LTE-A), WiMAX, WiFi, NR, or other wireless communication techniques.

Depending on the network type, other well-known terms may be used instead of "base station" or "BS," such as node B, evolved node B ("eNodeB" or "eNB"), a 5G node B ("gNodeB" or "gNB") or "access point." For the sake of convenience, the term "base station" and/or "BS" are used in this disclosure to refer to network infrastructure components that provide wireless access to remote terminals. Also, depending on the network type, other well-known terms may be used instead of "user equipment" or "UE," such as "mobile station" (or "MS"), "subscriber station" (or "SS"), "remote terminal," "wireless terminal," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extent of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

Although FIG. 1 illustrates one example of a wireless network 100, various changes may be made to FIG. 1. For example, the wireless network 100 could include any number of BSs and any number of UEs in any suitable arrangement. Also, the BS 101 could communicate directly with any number of UEs and provide those UEs with wireless broadband access to the network 130. Similarly, each BS 102-103 could communicate directly with the network 130 and provide UEs with direct wireless broadband access to the network 130. Further, the BS 101, 102, and/or 103 could provide access to other or additional external networks, such as external telephone networks or other types of data networks.

Figure 2:
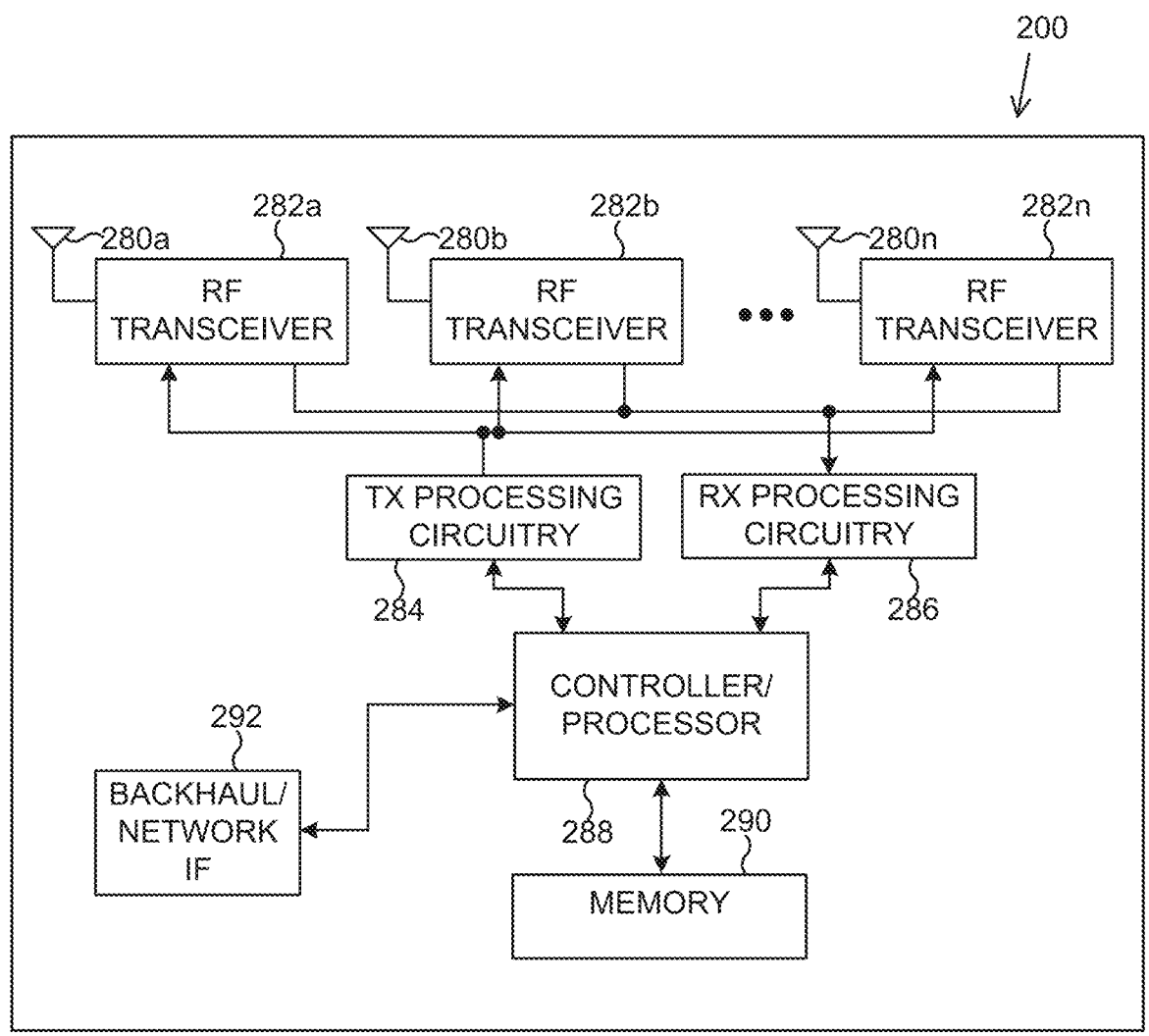
FIG. 2 illustrates an exemplary base station (BS) utilizing one of input circular buffer aided artificial intelligence or machine learning or channel environment classification according to various embodiments of this disclosure.

FIG. 2 illustrates an exemplary base station (BS) utilizing one of input circular buffer aided artificial intelligence or machine learning or channel environment classification according to various embodiments of this disclosure. The embodiment of the BS 200 illustrated in FIG. 2 is for illustration only, and the BSs 101, 102 and 103 of FIG. 1 could have the same or similar configuration. However, BSs come in a wide variety of configurations, and FIG. 2 does not limit the scope of this disclosure to any particular implementation of a BS.

As shown in FIG. 2, the BS 200 includes multiple antennas 280*a*-280*n*, multiple radio frequency (RF) transceivers 282*a*-282*n*, transmit (TX or Tx) processing circuitry 284, and receive (RX or Rx) processing circuitry 286. The BS 200 also includes a controller/processor 288, a memory 290, and a backhaul or network interface 292.

The RF transceivers 282*a*-282*n* receive, from the antennas 280*a*-280*n*, incoming RF signals, such as signals transmitted by UEs in the network 100. The RF transceivers 282*a*-282*n* down-convert the incoming RF signals to generate IF or baseband signals. The IF or baseband signals are sent to the RX processing circuitry 286, which generates processed baseband signals by filtering, decoding, and/or digitizing the baseband or IF signals. The RX processing circuitry 286 transmits the processed baseband signals to the controller/processor 288 for further processing.

The TX processing circuitry 284 receives analog or digital data (such as voice data, web data, e-mail, or interactive video game data) from the controller/processor 288. The TX processing circuitry 284 encodes, multiplexes, and/or digitizes the outgoing baseband data to generate processed baseband or IF signals. The RF transceivers 282a-282n receive the outgoing processed baseband or IF signals from the TX processing circuitry 284 and up-converts the baseband or IF signals to RF signals that are transmitted via the antennas 280a-280n.

The controller/processor 288 can include one or more processors or other processing devices that control the overall operation of the BS 200. For example, the controller/processor 288 could control the reception of forward channel signals and the transmission of reverse channel signals by the RF transceivers 282a-282n, the RX processing circuitry 286, and the TX processing circuitry 284 in accordance with well-known principles. The controller/processor 288 could support additional functions as well, such as more advanced wireless communication functions and/or processes described in further detail below. For instance, the controller/processor 288 could support beam forming or directional routing operations in which outgoing signals from multiple antennas 280a-280n are weighted differently to effectively steer the outgoing signals in a desired direction. Any of a wide variety of other functions could be supported in the BS 200 by the controller/processor 288. In some embodiments, the controller/processor 288 includes at least one microprocessor or microcontroller.

The controller/processor 288 is also capable of executing programs and other processes resident in the memory 290, such as a basic operating system (OS). The controller/processor 288 can move data into or out of the memory 290 as required by an executing process.

The controller/processor 288 is also coupled to the backhaul or network interface 292. The backhaul or network interface 292 allows the BS 200 to communicate with other devices or systems over a backhaul connection or over a network. The interface 292 could support communications over any suitable wired or wireless connection(s). For example, when the BS 200 is implemented as part of a cellular communication system (such as one supporting 6G, 5G, LTE, or LTE-A), the interface 292 could allow the BS 200 to communicate with other BSs over a wired or wireless backhaul connection. When the BS 200 is implemented as an access point, the interface 292 could allow the BS 200 to communicate over a wired or wireless local area network or over a wired or wireless connection to a larger network (such as the Internet). The interface 292 includes any suitable structure supporting communications over a wired or wireless connection, such as an Ethernet or RF transceiver.

The memory 290 is coupled to the controller/processor 288. Part of the memory 290 could include a RAM, and another part of the memory 290 could include a Flash memory or other ROM.

As described in more detail below, base stations in a networked computing system can be assigned as synchronization source BS or a slave BS based on interference relationships with other neighboring BSs. In some embodiments, the assignment can be provided by a shared spectrum manager. In other embodiments, the assignment can be agreed upon by the BSs in the networked computing system. Synchronization source BSs transmit OSS to slave BSs for establishing transmission timing of the slave BSs.

Although FIG. 2 illustrates one example of BS 200, various changes may be made to FIG. 2. For example, the BS 200 could include any number of each component shown in FIG. 2. As a particular example, an access point could include a number of interfaces 292, and the controller/processor 288 could support routing functions to route data between different network addresses. As another particular example, while shown as including a single instance of TX processing circuitry 284 and a single instance of RX processing circuitry 286, the BS 200 could include multiple instances of each (such as one per RF transceiver). Also, various components in FIG. 2 could be combined, further subdivided, or omitted and additional components could be added according to particular needs.

Figure 3:
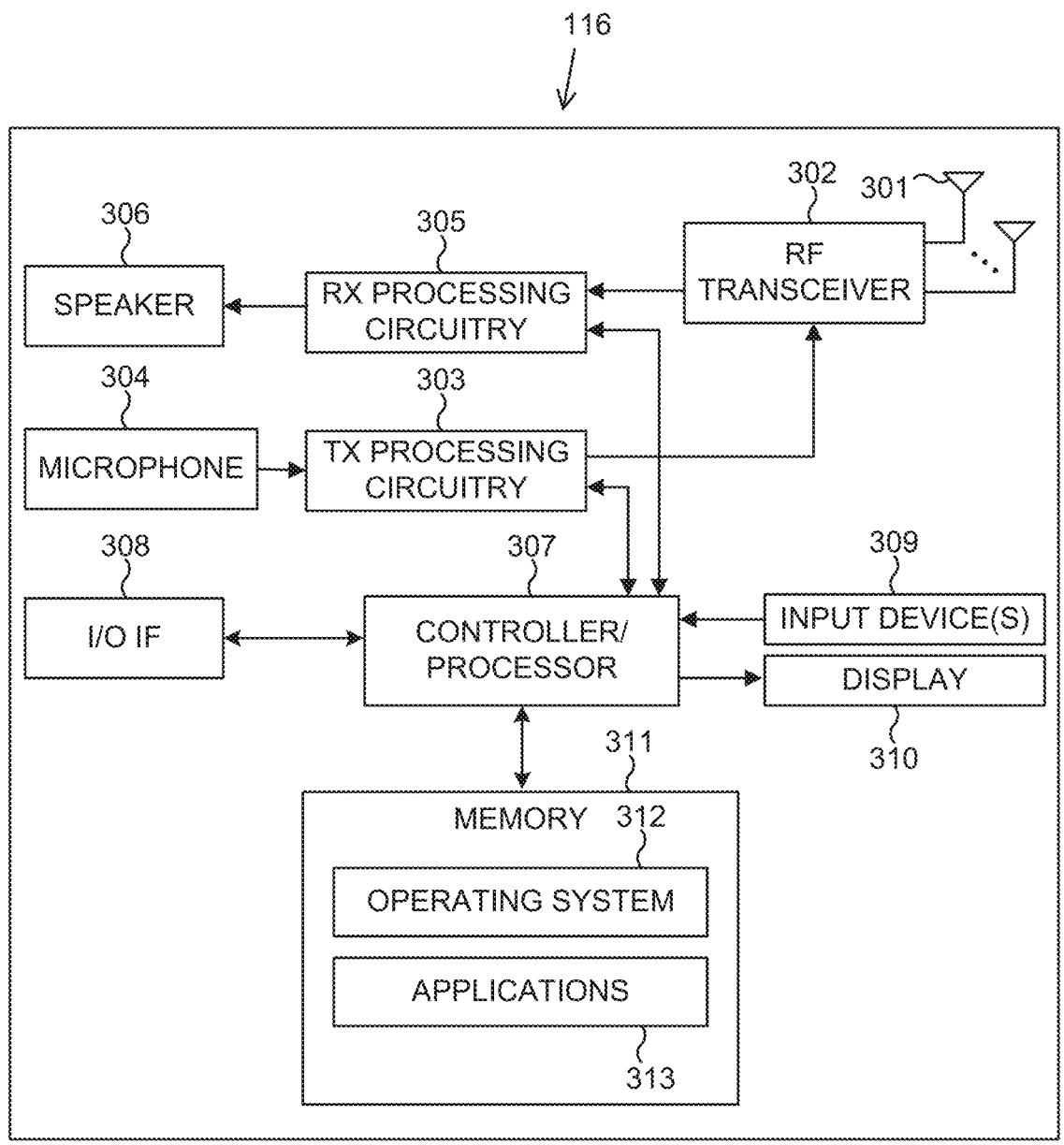
FIG. 3 illustrates an exemplary electronic device for communicating in the networked computing system utilizing one of input circular buffer aided artificial intelligence or machine learning or channel environment classification according to various embodiments of this disclosure.

FIG. 3 illustrates an exemplary electronic device for communicating in the networked computing system utilizing one of input circular buffer aided artificial intelligence or machine learning or channel environment classification according to various embodiments of this disclosure. The embodiment of the UE 116 illustrated in FIG. 3 is for illustration only, and the UEs 111-115 and 117-119 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes an antenna 301, a radio frequency (RF) transceiver 302, TX processing circuitry 303, a microphone 304, and receive (RX) processing circuitry 305. The UE 116 also includes a speaker 306, a controller or processor 307, an input/output (I/O) interface (IF) 308, a touchscreen display 310, and a memory 311. The memory 311 includes an OS 312 and one or more applications 313.

The RF transceiver 302 receives, from the antenna 301, an incoming RF signal transmitted by an gNB of the network 100. The RF transceiver 302 down-converts the incoming RF signal to generate an IF or baseband signal. The IF or baseband signal is sent to the RX processing circuitry 305, which generates a processed baseband signal by filtering, decoding, and/or digitizing the baseband or IF signal. The RX processing circuitry 305 transmits the processed baseband signal to the speaker 306 (such as for voice data) or to the processor 307 for further processing (such as for web browsing data).

The TX processing circuitry 303 receives analog or digital voice data from the microphone 304 or other outgoing baseband data (such as web data, e-mail, or interactive video game data) from the processor 307. The TX processing circuitry 303 encodes, multiplexes, and/or digitizes the outgoing baseband data to generate a processed baseband or IF signal. The RF transceiver 302 receives the outgoing processed baseband or IF signal from the TX processing circuitry 303 and up-converts the baseband or IF signal to an RF signal that is transmitted via the antenna 301.

The processor 307 can include one or more processors or other processing devices and execute the OS 312 stored in the memory 311 in order to control the overall operation of the UE 116. For example, the processor 307 could control the reception of forward channel signals and the transmission of reverse channel signals by the RF transceiver 302, the RX processing circuitry 305, and the TX processing circuitry 303 in accordance with well-known principles. In some embodiments, the processor 307 includes at least one microprocessor or microcontroller.

The processor 307 is also capable of executing other processes and programs resident in the memory 311, such as processes for CSI reporting on uplink channel. The processor 307 can move data into or out of the memory 311 as required by an executing process. In some embodiments, the processor 307 is configured to execute the applications 313 based on the OS 312 or in response to signals received from gNBs or an operator. The processor 307 is also coupled to the I/O interface 309, which provides the UE 116 with the ability to connect to other devices, such as laptop computers and handheld computers. The I/O interface 309 is the communication path between these accessories and the processor 307.

The processor 307 is also coupled to the touchscreen display 310. The user of the UE 116 can use the touchscreen display 310 to enter data into the UE 116. The touchscreen display 310 may be a liquid crystal display, light emitting diode display, or other display capable of rendering text and/or at least limited graphics, such as from web sites.

The memory 311 is coupled to the processor 307. Part of the memory 311 could include RAM, and another part of the memory 311 could include a Flash memory or other ROM.

Although FIG. 3 illustrates one example of UE 116, various changes may be made to FIG. 3. For example, various components in FIG. 3 could be combined, further subdivided, or omitted and additional components could be added according to particular needs. As a particular example, the processor 307 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

In one embodiment, the AI/ML techniques can be used for DL channel coding.

Figure 4:
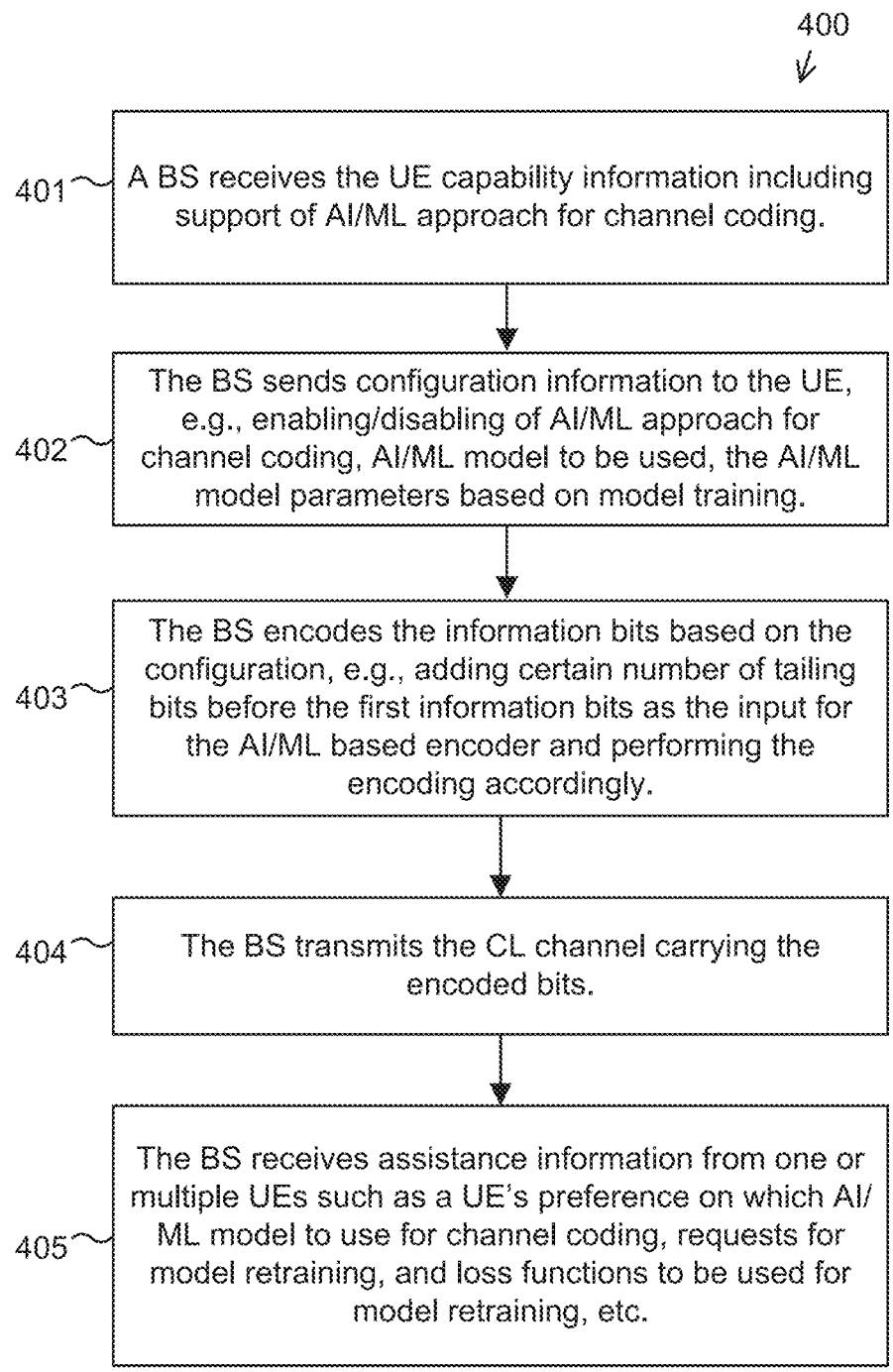
FIG. 4 shows an example flowchart for BS operation to support AI/ML techniques for DL channel coding according to embodiments of the present disclosure.

FIG. 4 shows an example flowchart for BS operation to support AI/ML techniques for DL channel coding according to embodiments of the present disclosure. FIG. 4 is an example of a method 400 for operations at BS side to support AI/ML techniques for DL channel coding. In the process 400, at operation 401, a BS receives the UE capability information from a UE, including the support of AI/ML approach for channel coding. At operation 402, the BS sends the configuration information to UE, which can include related configuration information for AI/ML decoders such as AI/ML model be used, the trained model parameters, input/output dimension of the AI/ML decoder, the input block length, how padding bits are handled and the presence of tailing bits. The AL/ML model parameters and indication approach are described below. In one embodiment, the AI/ML decoder can be configured to operate in specific scenarios which are determined by the type of physical channels (e.g., PDCCH, PUSCH, or PDSCH), the input block length, and the range of received signal-to-noise-ratio (SNR). In another embodiment, the AI/ML decoder can be enabled/disabled via control signaling. The enabling/disabling control message can be sent via DCI, MAC-CE, or RRC signaling. Regarding the model training operation, in one embodiment, the model parameters for cell-specific AI/ML decoder can be pre-trained at BS independent from UE or jointly with one or multiple UEs. In another embodiment, the model parameters for cell-specific AI/ML decoder can be trained at operator deployed test UE. In yet another embodiment, the model parameters for UE-specific AI/ML decoder can be trained/retrained on the fly at UEs using DL transmissions with signaling support. At operation 402, the BS encodes the information bits based on the configuration (e.g., adding certain number of tailing bits before the first information bit as the input for the AI/ML based encoder), and performs the encoding based on the configuration as described below. At operation 404, the BS transmits the DL channel carrying the encoded bits. At operation 405, the BS receives assistance information from one or multiple UEs, such as a UE's preference on which AI/ML model to use for channel coding, requests for model retraining, measured loss value associated with the current AI/ML model, which may be in terms of BER, BLER, or any reliability measure, and loss function to be used for model retraining, etc. For example, UEs can request model training once the variations in channel conditions, such as the change in interference distribution and SNR, or certain level of performance degradations are detected.

In one embodiment for operation 402, the configuration from BS can also include a range of transmission block size (TBS) values for AI/ML channel coding/decoding method. For instance, a UE can be configured with a maximum DL TBS for which AI/ML-based channel decoding is used, and the UE assumes conventional non-AI/ML-based channel decoding for TBS greater than configured maximum TBS for AI/ML-based approach.

Figure 5:
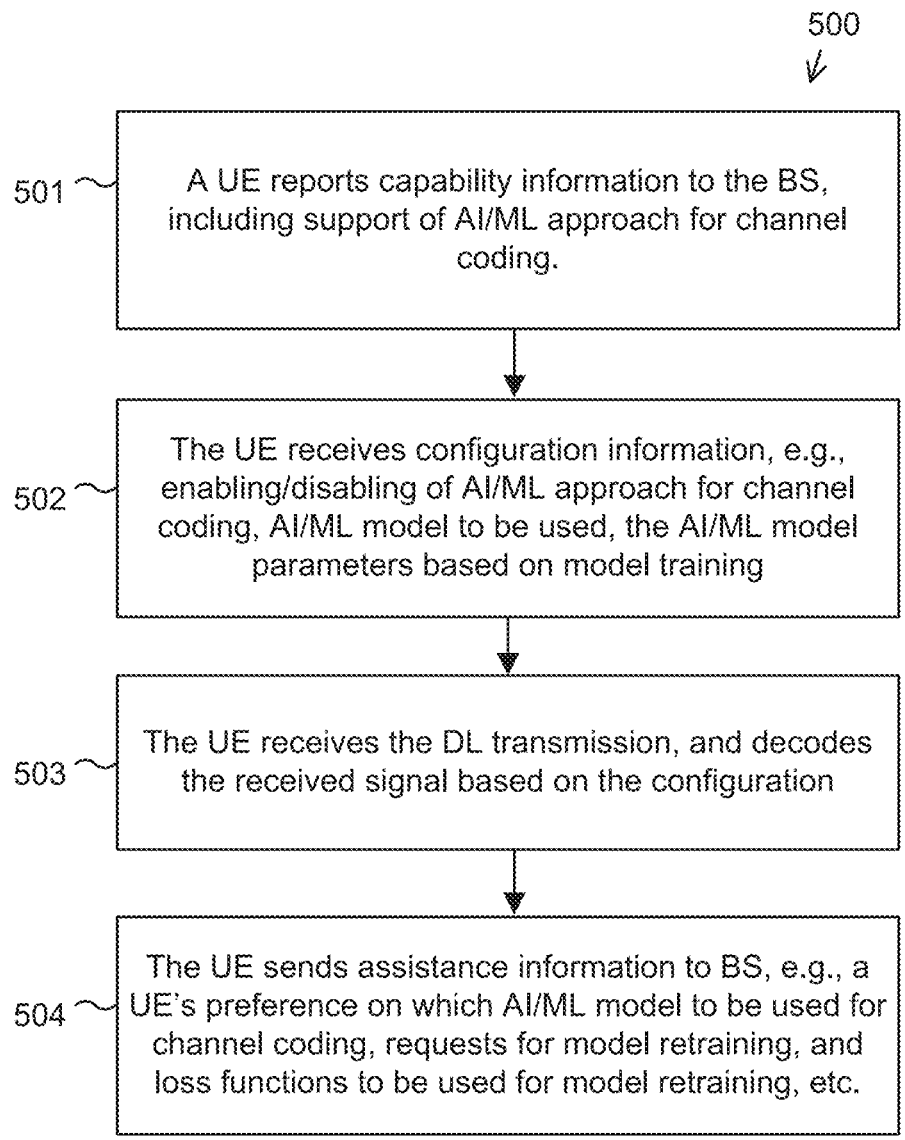
FIG. 5 shows an example flowchart for UE operation to support AI/ML techniques for DL channel coding according to embodiments of the present disclosure.

FIG. 5 shows an example flowchart for UE operation to support AI/ML techniques for DL channel coding according to embodiments of the present disclosure. FIG. 5 illustrates an example of a method 500 for operations at UE side to support AI/ML techniques for DL channel coding. At operation 501, a UE reports capability information to BS, including support of AI/ML approach for channel coding. At operation 502, the UE receives configuration information, such as AI/ML decoders to be used, the trained model parameters, input/output dimension of the AI/ML decoder, the input block length, how padding bits are handled, the presence of tailing bits, maximum TBS for AI/ML based approach, and the scenarios where the AI/ML decoders should be applied. At operation 503, the UE receives the DL transmission, and perform the decoding based on the configuration. At operation 504, the UE sends assistance information to BS, e.g., UE's preference on which AI/ML model to be used for channel coding, requests for model retraining, measured loss value associated with the current AI/ML model, which may be in terms of BER, BLER, or any reliability measure, and loss function to be used for model retraining, etc., as is subsequently described below.

In one embodiment, UE receives enabling/disabling control message from BS via DCI, MAC-CE, or RRC signaling. According to the received indication, the UE performs decoding according to the configured AI/ML-based decoder or conventional non-AI/ML-based decoder with corresponding parameters. In the case of DCI, one additional bit field or existing bit field can be used to dynamically indicate the enabling/disabling of AI/ML-based approach regardless of the maximum TBS configured for AI/ML-based channel coding In one embodiment, the AI/ML techniques can be used for UL channel coding.

Figure 6:
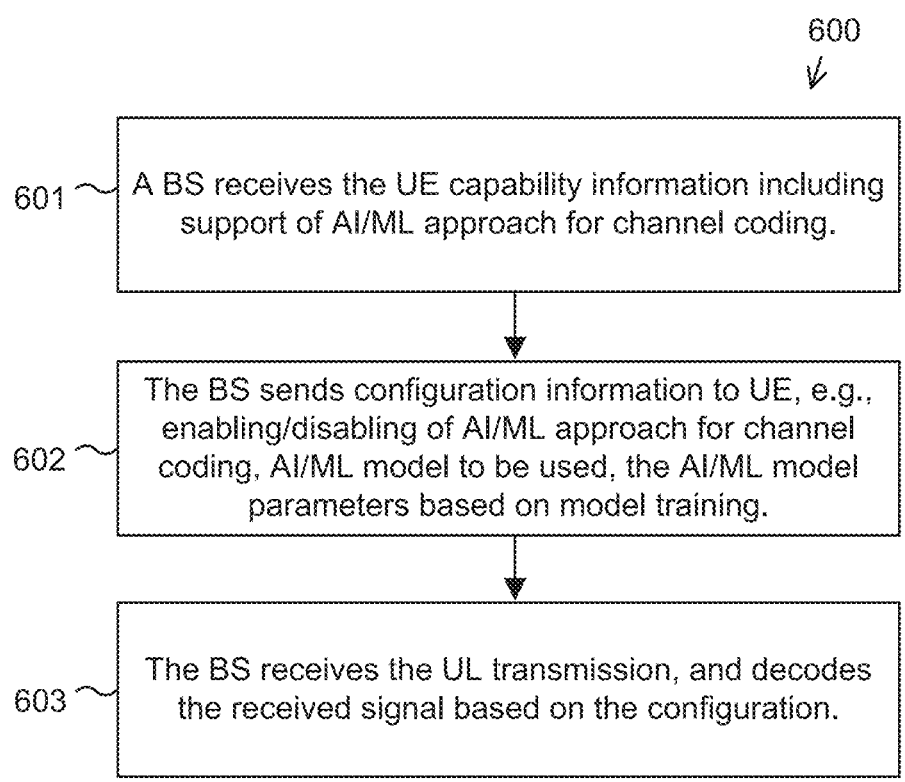
FIG. 6 shows an example flowchart for BS operation to support AI/ML techniques for UL channel coding according to embodiments of the present disclosure.

FIG. 6 shows an example flowchart for BS operation to support AI/ML techniques for UL channel coding according to embodiments of the present disclosure. FIG. 6 is an example of a method 600 for operations at BS side to support AI/ML techniques for UL channel coding. At operation 601, a BS receives the UE capability information from a UE, including the support of AI/ML approach for channel coding. At operation 602, the BS sends configuration information to UE, which can include configuration information related to AI/ML encoder such as AI/ML model be used, the trained model parameters, input/output dimension of the AI/ML encoder, the input block length, how padding bits and tailing bits are handled, maximum TBS for AI/ML-based channel coding, and the conditions when AI/ML encoders should be applied. Cell-specific AI/ML encoders can be pre-trained at the BS or operator deployed test UEs using DL transmissions. Alternatively, UE-specific AI/ML encoders can be online trained/retrained at the UEs using UL transmissions. At operation 603, the BS receives the UL transmission, and decodes the received signal based on the configuration.

The BS can send enabling/disabling control message for AI/ML-based UL channel coding via DCI, MAC-CE, or RRC signaling. In the case of DCI, one additional bit field or existing bit field can be used in UL DCI types to dynamically indicate the enabling/disabling of AI/ML-based approach regardless of the maximum TBS configured for AI/ML-based channel coding.

In one embodiment for operation 602, the configuration from BS can also include a range of UL TBS values for AI/ML-based channel coding/decoding method. For instance, a UE can be configured with a maximum UL TBS for which AWL-based channel encoding is performed, and the UE assumes conventional non-AI/ML-based channel encoding for TBS greater than configured maximum TBS for AI/ML-based approach. This maximum TBS for AI/ML-based channel coding can be configured to be identical for both DL/UL or can be configured separately.

Figure 7:
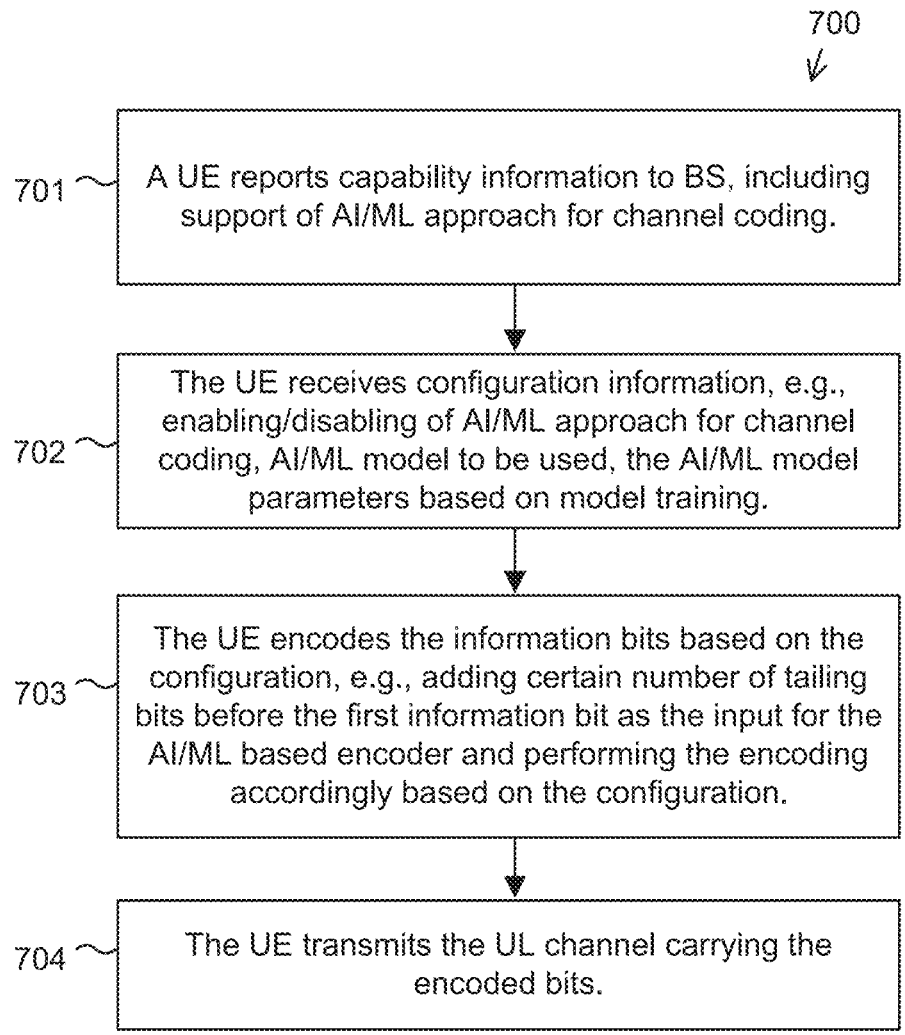
FIG. 7 shows an example flowchart UE operation to support AI/ML techniques for UL channel coding according to embodiments of the present disclosure.

FIG. 7 shows an example flowchart UE operation to support AI/ML techniques for UL channel coding according to embodiments of the present disclosure. FIG. 7 is an example of a method 700 for operations at UE side to support AI/ML techniques for UL channel coding. At operation 701, a UE reports its capability information to BS, including the support of AI/ML approach for channel coding. At operation 702, the UE receives configuration information, including information related to AI/ML encoders such as AI/ML model be used, the trained model parameters, input/output dimension of the AI/ML encoder, the input block length, how padding bits and tailing bits are handled, the maximum TBS size for AI/ML-based channel coding, and the conditions when AI/ML encoders should be applied. At operation 703, the UE encodes the information bits based on the configuration, e.g., adding certain number of tailing bits before the first information bits as the input for the AI/ML based encoder, and performs the encoding based on configuration as described below. At operation 704, the UE transmits the UL channel carrying the encoded bits.

In one embodiment, UE receives enabling/disabling control message from BS via DCI, MAC-CE, or RRC signaling. According to the received indication, the UE performs decoding according to the configured AI/ML-based decoder or conventional non-AI/ML-based decoder with corresponding parameters.

For both UL/DL, the AI/ML-based approach can be applied only for encoder or decoder, or applied for both encoder and decoder. The training can be performed only at BS or at UE, or at both BS and UE. Either a UE, a BS, or both UE and BS can send assistance information to each other such as preference on which AI/ML model to be used for channel coding, requests for model retraining, measured loss value associated with the current AI/ML model, which may be in terms of BER, BLER, or any reliability measure, and loss function to be used for model retraining, etc.

Figure 8A:
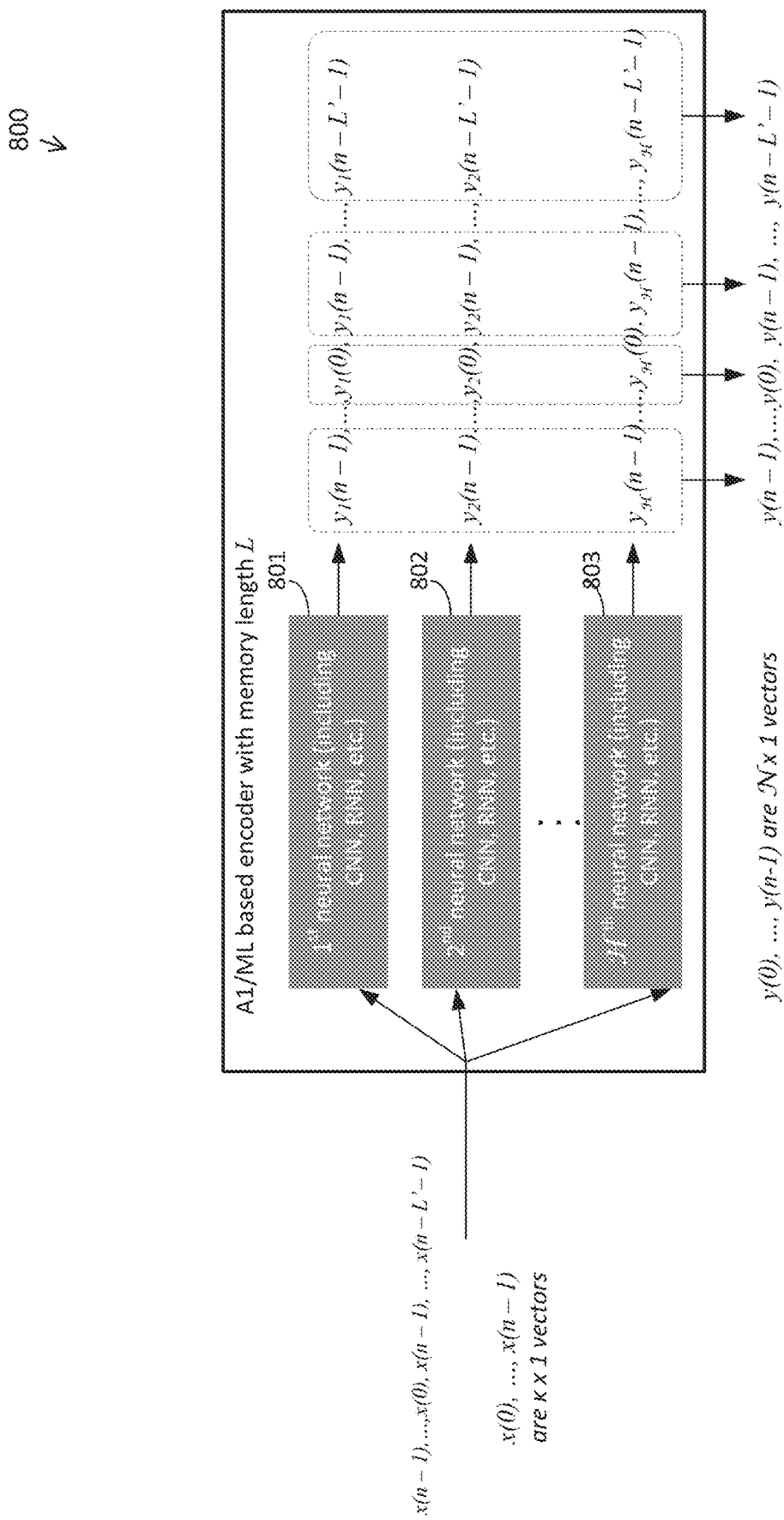
Figure 8B:
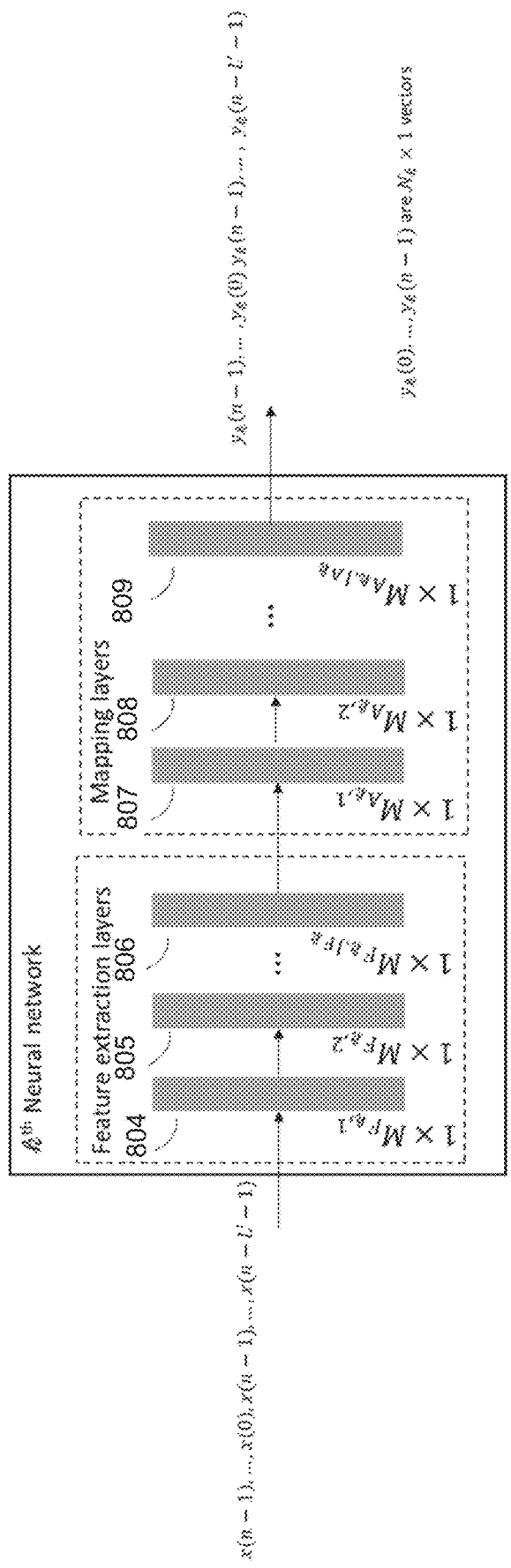

A circular input buffer aided encoding operation is defined. The configuration of the AI/ML encoder is presented in FIGS. 8A and 8B. FIG. 8A depicts the overall architecture of a circular buffer aided AI/ML encoder, while FIG. 8B depicts the overall architecture of the $\hbar$ th neural network therein. The circular buffer aided AI/ML encoder 800 of FIG. 8A includes neural networks 801, 802 and 803, where neural network 803 is the $\hbar$ th neural network depicted in greater detail in FIG. 8B. The $\hbar$ th neural network 803 includes extraction layers 804, 805 and 806 and mapping layers 807, 808 and 809.

The configuration and operation of an input circular buffer aided AI/ML encoder 800 with rate $\kappa/\mathcal{N}$ and memory length L, respectively. The memory length L implies that the output of the AI/ML encoder is not only determined by the current input but also affected by the previous L inputs. The value of L can be directly calculated based on the AI/ML model or determined via experiments/simulations. For example, if the AI/ML encoder is built with J convolutional layers with the same kernel size ke, L can be directly obtained as $ke^J$. If the AI/ML, encoder is built with recurrent layers, L can be obtained via experiments/simulations. The bit sequence input for channel coding is denoted as $c_0, c_1, c_2, c_3, \ldots, c_{K-1}$, where K is the number of bits to encode. $c_0, c_1, c_2, c_3, \ldots, c_{K-1}$ are grouped into n vectors of size $\kappa \times 1$, denoted as $x(0), x(1), x(2), \ldots, x(n-1)$, and input to the AI/ML based encoder, where n is the smallest integer with $n\kappa \geq K$.

Figure 9A:
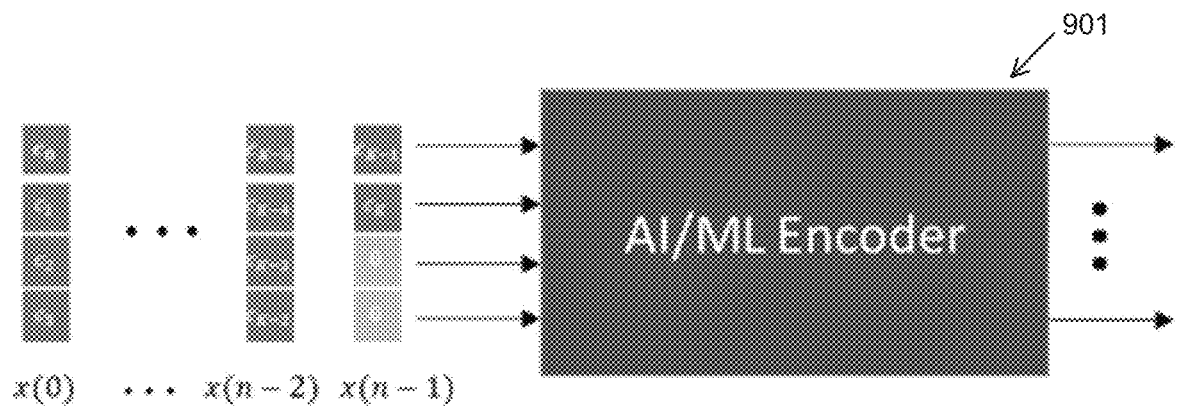
FIGS. 9A and 9B illustrate the operation of adding padding bits when input block length K is not a multiple of the input dimension κ of the AI/ML encoder.
Figure 9B:
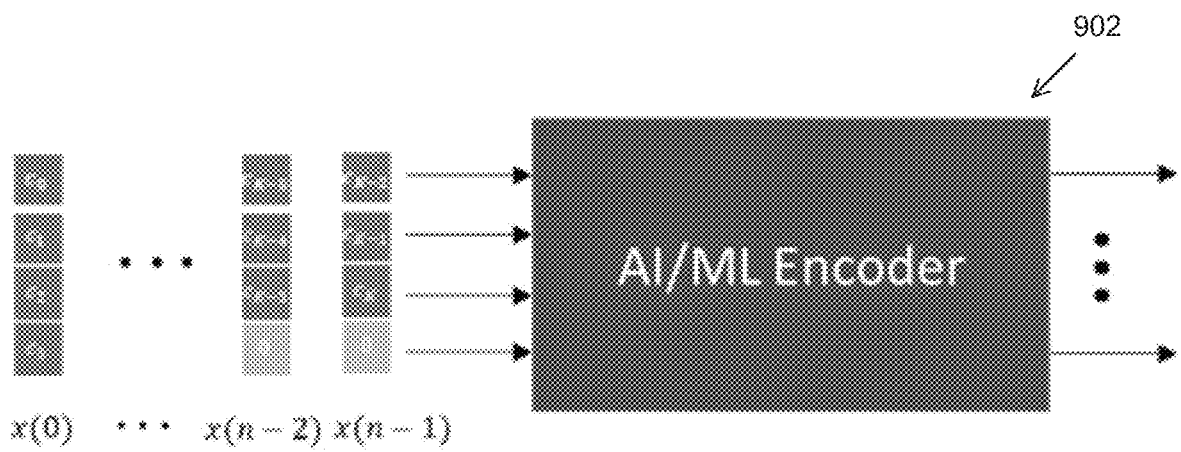

FIGS. 9A and 9B illustrate the operation of adding padding bits when input block length K is not a multiple of the input dimension $\kappa$ of the AI/ML encoder. If K is not a multiple of $\kappa$, padding is performed before input of $x(0), x(1), x(2), \ldots, x(n-1)$ to the AI/ML encoder, as shown in FIGS. 9A and 9B. In one embodiment, padding bits can be allocated only to a single vector selected among $x(0), x(1), x(2), \ldots, x(n-1)$. For example, in padding scheme 901, as shown in FIG. 9A, where $\kappa=4$, the 2 padding bits are allocated to $x(n-1)$, and $x(n-1)$ will consist of 2 information bits and 2 padding bits. In another embodiment, padding bits can be distributed among multiple vectors. For example, in padding scheme 902, as shown in FIG. 9B, one of the padding bits can be allocated to $x(n-1)$, and the other padding bit can be allocated to $x(n-2)$. In this case, both $x(n-1)$ and $x(n-2)$ will consist of 3 information bits and one padding bit.

The AI/ML based encoder 800 generates an output vector of length $\mathcal{N}$ with $\mathcal{H}$ neural networks, such as neural networks 801, 802, and 803, for each input vector of length $\kappa$, where the $\hbar$-th neural network outputs a vector of length $\mathcal{N}_\hbar$ for every $\kappa$ input bits so that $\Sigma_{\hbar \in \mathcal{H}} \mathcal{N}_\hbar = \mathcal{N}$. In one embodiment, one of these neural networks, such as neural network 801, can be an identity mapping which generates the systematic output of the encoder. The $\hbar$-th neural network consists of $J_{F_\hbar}$ feature extraction layers, such as feature extraction layers 804, 805, and 806, and $J_{A_\hbar}$ mapping layers, such as feature extraction layers 807, 808, and 809. Each of the $J_{F_\hbar}$ feature extraction layers, such as feature extraction layer 804, can be a convolutional layer with the number of filters $f_j$, kernel size $ke_j$, stride $s_j$ and the number of padding elements $pd_j$, a layer of $M_{F_\hbar,j}$ ($j \in \{1, \ldots, J_{F_\hbar}\}$) recurrent units (e.g., gated recurrent units (GRU), recurrent neural network (RNN), long short-term memory (LSTM)), or any other type of layer. Each of the $J_{A_\hbar}$ mapping layers, such as mapping layer 807, can be a fully connected layer with $M_{A_\hbar,j}$ neurons, a quantization layer, or any other type of layer. The first feature extraction layer 804 accepts a length $\mathcal{L}_{in,\hbar}$ vector as input and the last feature extraction layer 806 output a vector of length $\mathcal{L}_{F_A,out}$, where $\mathcal{L}_{in,ℏ}$ =(n+L'−1)κ if the first feature extraction layer 804 is a convolutional layer and $\mathcal{L}_{in,ℏ}$ =κ if the first feature extraction layer 804 is a recurrent layer. $\mathcal{L}_{F_ℏ,out}$= $\mathcal{L}_{A_ℏ,in}$, where $\mathcal{L}_{A_ℏ,in}$ is the length of the input vector of the first mapping layer 807. The last mapping layer 809 output a vector of length $\mathcal{L}_{out,ℏ}$ as the encoding results of the $ℏ$-th neural network. For example, $\mathcal{L}_{out,ℏ}$ =(n+l'−1)$\mathcal{N}_ℏ$ if the $ℏ$-th neural network is built with convolutional neural networks (CNNs) and $\mathcal{L}_{out,ℏ}$ = $\mathcal{N}_ℏ$ if the $ℏ$-th neural network is built with RNNs. In one embodiment, the elements of the vector output from the last mapping layer 809 can be continuous-valued. In another embodiment, the elements of the vector output from the last mapping layer 809 can be quantized to discrete values.

Figure 10:
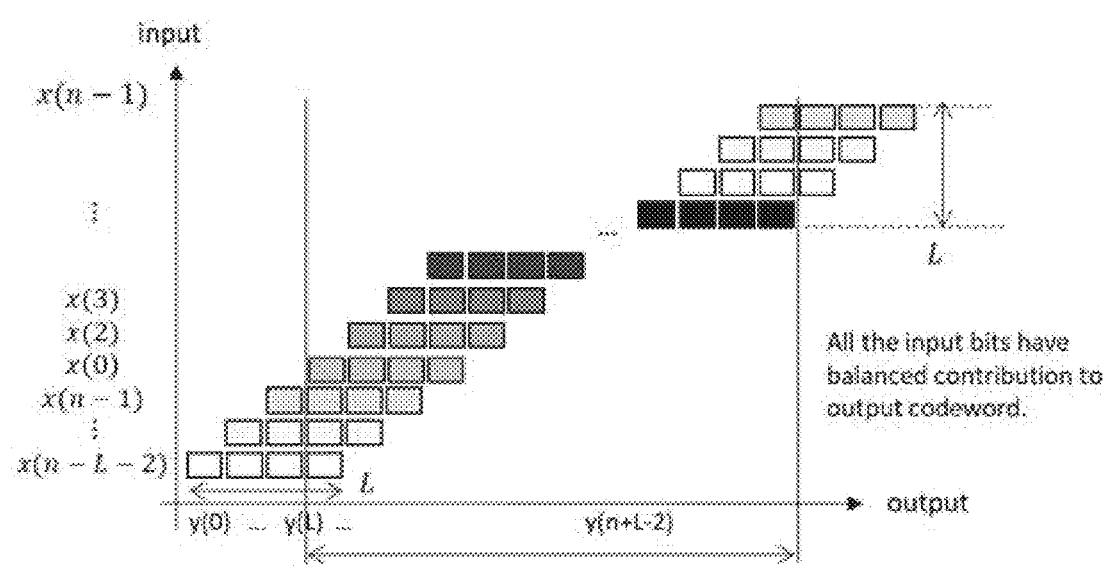
FIG. 10 depicts the operation of an input circular buffer aided encoding when L'=L.

Before input to the encoder, the last L'−1 vectors x(n−L'−2), . . . , x(n−1) are added to the beginning of the sequence x(0), x(1), x(2), . . . , x(n−1) to obtain the sequence x(n−L'−2), . . . , x(n−1), x(0), x(1), x(2), . . . , x(n−1). L' is determined by the memory length of the AI/ML based encoder. In one embodiment, L' can be set to L−1 if L is exactly known, for example, via directly calculation if the AI/ML based encoder is built with CNNs or through experiments/simulations if the AI/ML based encoder is built with RNNs. In another embodiment, L' can be set to $\hat{L}$−1 or n−1, where $\hat{L}$ is an upper bound on the memory length of the AI/ML encoder. x(n−L'−2), . . . , x(n−1), x(0), x(1), x(2), . . . , x(n−1) are either sequentially or simultaneously input to the AI/ML encoder. For example, x(n−L'−2), . . . , x(n−1), x(0), x(1), x(2), . . . , x(n−1) are sequentially input to the AI/ML encoder if the AI/ML encoder is built with RNNs and simultaneously input to the AI/ML encoder if the AI/ML encoder is built with CNNs. After AI/ML based encoding, the last n−1 vectors y(L), . . . , y(n+L−2) are taken from y(0), . . . , y(n+L−2) as the output of the AI/ML based encoder. In comparison to the normal AI/ML based encoder, the input bits will have balanced contribution and protection when the input circular buffer aided AI/ML encoder is used, as shown in FIG. 10, which depicts the operation of an input circular buffer aided encoding when L'=L.

Information content for AI/ML model parameters

The AI/ML model parameters related to channel coding (e.g., at operations 502, 502, 602, or 702) can include one or multiple of the following information.

Enabling/disabling of ML approach for different physical channels and block sizes In one embodiment, the configuration information can include whether AI/ML techniques for certain physical channels and block sizes is enabled or disabled. One or multiple physical channel and block size combinations can be predefined. For example, there can be K predefined combinations, with index 1, 2, . . . , K corresponding to one combination such as "PDSCH and less than 1000 bits", "PDCCH and less than 500 bits", etc., respectively. The configuration can indicate the indexes of the combinations which are enabled, or there can be a Boolean parameter to enable or disable the AI/ML approach for each combination.

ML Model to be Used

In one embodiment, the configuration information can include which AI/ML model to be used for certain operation/use case. For example, there can be M predefined ML models, with index 1, 2, . . . , M corresponding to one ML model defined by the configuration of the encoder and/or decoder. In one example, the ML model can be associated with L', including the case where L'=0. Alternatively, L' can be separately indicated. TABLE 1 provides an example of this embodiment. One or more columns in TABLE 1 can be optional and directly sent, instead of being indicated through the table index, in different embodiments.

TABLE 1

Example of configurations of the ML models.

| Model | Encoder | Decoder |
|---|---|---|
| 1 | Systematic output, continuous-valued output, number of neural networks, the configuration of each neural network (e.g., number of convolutional layers for each neural network, kernel size and stride for each convolutional layer, number of fully connected layers, number of neurons in each layer), etc. | Systematic components, continuous-valued input, number of neural networks, the configuration of each neural network (e.g., number of convolutional layers for each neural network, kernel size and stride for each convolutional layer, number of fully connected layers, number of neurons in each layer), etc. |
| 2 | No systematic output, L', discretized output, number of neural networks, the configuration of each neural network (e.g., number of convolutional layers for each neural network, kernel size and stride for each convolutional layer, interleaved input, number of fully connected layers, number of neurons in each layer), etc. | No systematic component, L', discretized input, number of neural networks, the configuration of each neural network (number of convolutional layers for each neural network, kernel size and stride for each convolutional layer, deinterleaver, number of fully connected layers, number of neurons in each layer), etc. |
| 3 | Systematic output, L', discretized output, number of neural networks, the configuration of each neural network (e.g., number of recurrent layers, number of GRUs in each recurrent layer, number of fully connected layers, number of neurons in each layer), etc. | Systematic components, L', discretized input, number of neural networks, the configuration of each neural network (e.g., number of recurrent layers, number of GRUs in each recurrent layer, number of fully connected layers, number of neurons in each layer), etc. |
| . . . | . . . | . . . |
| M | No systematic output, continuous-valued output, number of neural | No systematic components, continuous-valued input, number of neural networks, |

TABLE 1-continued

Example of configurations of the ML models.

| Model | Encoder | Decoder |
|---|---|---|
| | networks, the configuration of each neural network (e.g., number of recurrent layers, number of LSTM units in each recurrent layer, number of fully connected layers, number of neurons in each layer), etc. | the configuration of each neural network (e.g., number of recurrent layers, number of LSTM units in each recurrent layer, number of fully connected layers, number of neurons in each layer), etc. |

Model Parameters

The configuration information can include the model parameters of ML algorithms. In another embodiment, the parameters of the ML model can be either directly sent or indicated through the index in a predefined table. For example, there can be K predefined operation modes, where each mode corresponding to certain operation/use case (e.g., the physical channel and block sizes combination) with certain ML model. One or more modes can be configured. TABLE 2 provides an example of this embodiment, where the configuration information can include one or multiple mode indexes to enable the parameter settings of ML encoder/decoder. One or more columns in TABLE 2 can be optional in different embodiments.

TABLE 2

Example of AI/ML operation modes, where different operations/use cases, ML models and/or corresponding key model parameters can be predefined

| Mode | Operation/use case | ML model | Parameters |
|---|---|---|---|
| 1 | PDSCH, less than 1000 bits | 2 | Weights and bias for connection between neurons in different layers, activation function, etc. |
| 2 | PDSCH, larger than 1000 bits | 3 | Weights and bias for connection between neurons in different layers, activation function, etc. |
| 3 | PDCCH, less than 500 bits | M | Weights and bias for connection between neurons in different layers, activation function, etc. |
| ... | ... | ... | ... |
| K | PUCCH, larger than 500 bits | 1 | Weights and bias for connection between neurons in different layers, activation function, etc. |

Signaling Method

In one embodiment, part of or all the configuration information can be broadcasted as a part of cell-specific information, for example by system information such as master information block (MIB), system information block 1 (SIB1) or other SIBs. For example, the configuration information for AI/ML approaches for channel coding can be carried as part of SIB3 and/or SIB4. Alternatively, a new SIB can be introduced for the indication of configuration information. For example, the enabling/disabling of ML approach, ML model and/or model parameters for certain physical channels and block sizes can be broadcasted. In other examples, multiple modes can be configured. In another example, the updates of model parameters can be broadcasted. In yet another example, the configuration information of neighboring cells, e.g., the enabling/disabling of ML approach, ML model and/or model parameters for certain physical channels and block sizes of neighboring cells, can be indicated as part of the system information, e.g., in MIB, SIB1, SIB3, SIB4 or other SIBs. In another embodiment, part of or all the configuration information can be sent by UE-specific signaling. The configuration information can be common among all configured DL/UL bandwidth parts (BWPs) or can be BWP-specific. For example, the UE-specific radio resource control (RRC) signaling, such as an information element (IE) PDSCH-ServingCellConfig or an IE PDSCH-Config in IE BWP-DownlinkDedicated, can include configuration of enabling/disabling ML approach for channel coding, which ML model to be used and/or model parameters. In yet another embodiment, part of or all the configuration information can be sent by group-specific signaling. A UE group-specific radio network temporary identifier (RNTI) can be configured, e.g., using value 0001-FFEF or the reserved value FFF0-FFFD. The group-specific RNTI can be configured via UE-specific RRC signaling.

UE Assistance Information

The UE assistance information related to AI/ML techniques (e.g., at operations 405 or 504) can include one or multiple of the information, such as hybrid automatic repeat request acknowledgement (HARQ-ACK) feedback, CSI report, and/or new information such as UE's preference on which AI/ML model to be used for channel coding, requests for model retraining, and loss function to be used for model retraining, etc.

For connected mode UEs, the report of the assistance information can be via PUCCH and/or PUSCH. A new UCI type, a new PUCCH format and/or a new MAC CE can be defined for the assistance information report.

Regarding the triggering method, in one embodiment, the report can be triggered periodically, e.g., via UE-specific RRC signaling. In another embodiment, the report can be semi-persistence or aperiodic. For example, the report can be triggered by the DCI, where a new field (e.g., 1-bit triggering field) can be introduced to the DCI for the report triggering. In one example, an IE similar to IE CSI-Report-Config can be introduced for the report configuration of UE assistance information to support AI/ML based channel coding. In yet another embodiment, the report can be triggered via certain event. For example, the UE can report its preference on DL AI/ML based channel code selection in case of measured reference signal received power (RSRP) going below a certain threshold. Whether UE should report its preference on AI/ML model selection can additionally depend on the configuration, e.g., configuration via RRC signaling regarding whether the UE needs to report the updates on its preferred AI/ML model. TABLE 3 provides an example of the IE for the configuration of UE assistance information report, where whether the report is periodic or semi-persistence or aperiodic, the resources for the report transmission, and/or report contents can be included. For the 'model-channelcoding', the UE assistance information report is given as an example that a set of AI/ML based channel coding schemes are predefined, and UE can report one of this via the index L1, L2, etc. However, other methods for report of UE's preference on AI/ML based channel coding schemes are not excluded.

TABLE 3

Example of IE for configuration of UE assistance information report for support of AI/ML based channel coding.

```
MlReport-ReportConfig ::=         SEQUENCE {
    reportConfigId                MlReport-ReportConfigId,
    reportConfigType              CHOICE {
        periodic                                  SEQUENCE {
            reportSlotConfig                      MlReport-
                ReportPeriodicityAndOffset,
            pucch-MlReport-ResourceList   SEQUENCE   (SIZE
                (1..maxNrofBWPs)) OF PUCCH-MlReport-Resource
        },
        semiPersistentOnPUCCH                     SEQUENCE {
            reportSlotConfig                      MlReport-
                ReportPeriodicityAndOffset,
            pucch-MlReport-ResourceList   SEQUENCE   (SIZE
                (1..maxNrofBWPs)) OF PUCCH-MlReport-Resource
        },
        semiPersistentOnPUSCH                     SEQUENCE {
            reportSlotConfig                      ENUMERATED
                {sl5, sl10, sl20, sl40, sl80, sl160, sl320},
            reportSlotOffsetList           SEQUENCE   (SIZE
                (1..maxNrofUL-Allocations)) OF INTEGER(0..32),
            p0alpha                               P0-PUSCH-
                AlphaSetId
        },
        aperiodic                                 SEQUENCE {
            reportSlotOffsetList           SEQUENCE   (SIZE
                (1..maxNrofUL-Allocations)) OF INTEGER(0..32)
        }
    },
    reportQuantity                CHOICE {
        none                      NULL,
        model-channelcoding       ENUMERATED {L1, L2, ...}
        ...
    },
MlReport-ReportPeriodicityAndOffset ::= CHOICE {
    slots4                        INTEGER(0..3),
    slots5                        INTEGER(0..4),
    slots8                        INTEGER(0..7),
    slots10                       INTEGER(0..9),
    slots16                       INTEGER(0..15),
    slots20                       INTEGER(0..19),
    slots40                       INTEGER(0..39),
    slots80                       INTEGER(0..79),
    slots160                      INTEGER(0..159),
    slots320                      INTEGER(0..319)
}
PUCCH-mlReport-Resource ::=       SEQUENCE {
    uplinkBandwidthPartId         BWP-Id,
    pucch-Resource                PUCCH-ResourceId
}
...
}
```

In one embodiment, a channel environment can be classified in terms of UE speed (or, similarly, Doppler spread) and/or frequency selectivity (or, similarly, delay spread). In another embodiment, a channel environment can be classified in terms of coherence bandwidth and/or coherence time. As an example, one possible categorization can be done for four classes comprising of low Doppler spread-low delay spread class, high Doppler spread-low delay spread case, low Doppler spread-high delay spread case, and high Doppler spread-high delay spread case.

Multiple channel environment classes can be defined with the above-mentioned attributes or in conjunction with other parameters such as RRM metrics, such as RSRP, RSRQ, and SINR. The channel environment classification can be done according to any combination of attributes aforementioned.

In one embodiment, the framework for supporting AI/ML techniques for channel environment classification can include model training at a UE or a network entity or outside of the network (e.g., via offline training), and model inference operations at a UE.

Figure 11:
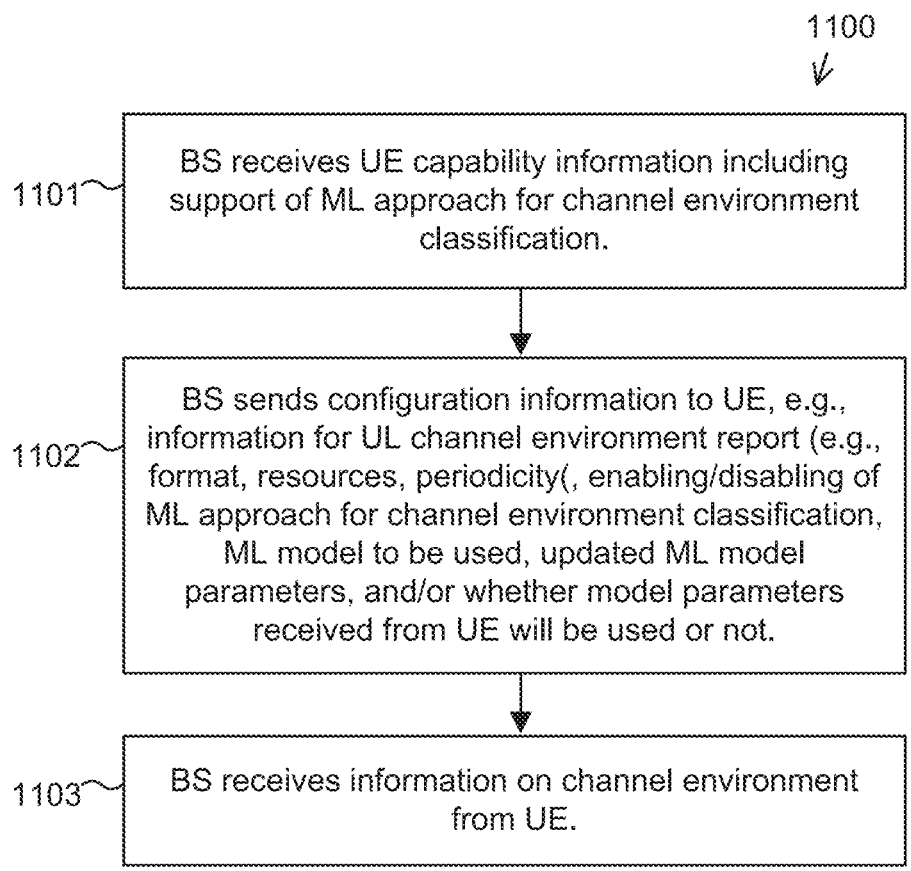
FIG. 11 shows an example flowchart for BS operation to support UE information on channel environments according to embodiments of the present disclosure.

FIG. 11 shows an example flowchart for BS operation to support UE information on channel environments according to embodiments of the present disclosure. FIG. 11 is an example of a method 1100 for operations at a BS to support AI/ML techniques for channel environment classification where a UE sends information on a particular channel environment. At operation 1101, the BS receives UE capability information from the UE, including the support of an ML approach for channel environment classification. At operation 10102, the BS sends configuration information to the UE, which can include ML-related configuration information such as enabling/disabling of an ML approach for channel environment classification, an ML model to be used, trained model parameters, and/or whether model parameter updates reported by the UE will be used or not; this information will be described below. Also, the BS may send configuration information for the UE to provide channel environment reports to the BS, which can contain the UL report channel format, resource, aperiodic/periodic/semi-persistent configuration, periodicity, etc., as presented later with exemplary configuration IEs (Information Elements). At operation 1103, the BS receives information on a channel environment from the UE, where the message can work as a recommendation to the BS for making any operational decisions such as scheduling or any kinds of adaptation. In one example, information can consist of an index to a pre-defined lookup table of channel environments. In another example, information can consist of a value for the DL RS density in time and/or frequency. In yet another example, information can consist of a recommendation for handover to another BS, a recommendation for transmission mode, a recommendation for scheduled time/frequency resource, a recommendation for MIMO beamforming adjustment from the current served beams, etc., along with the feedback on the inferred channel environment classification.

Figure 12:
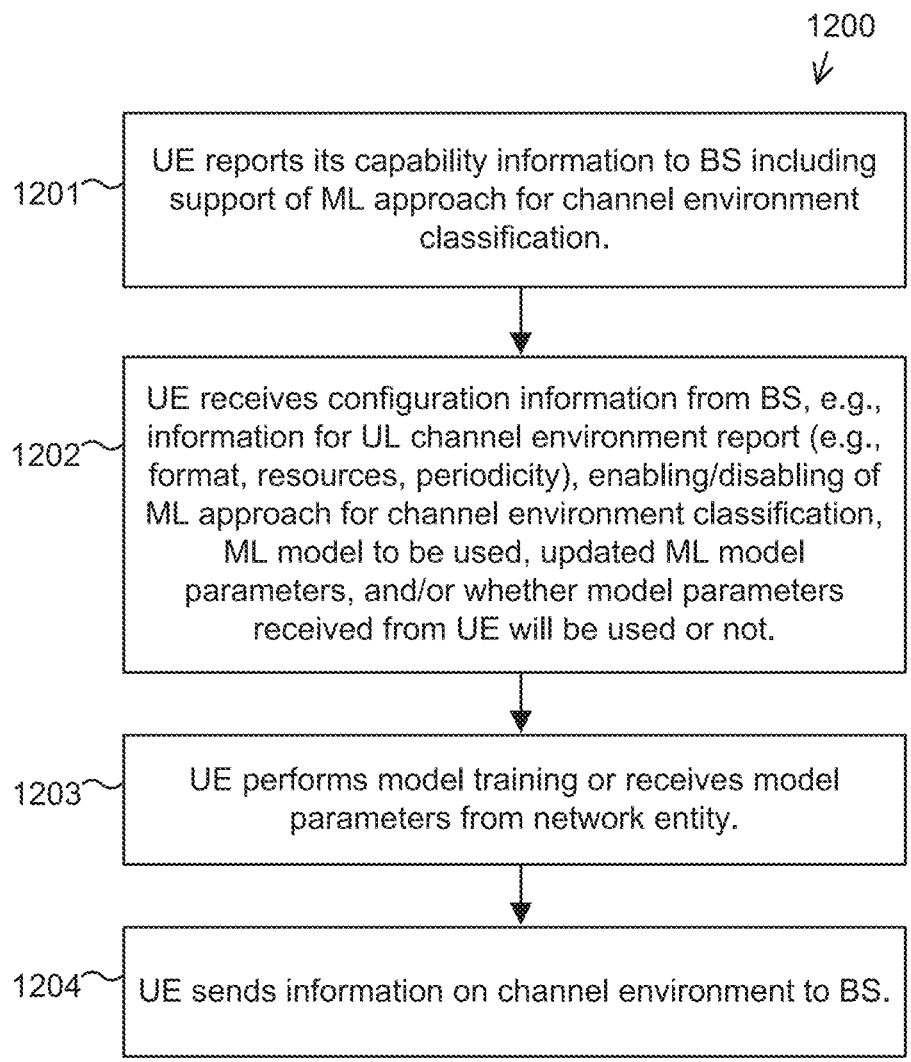
FIG. 12 shows an example flowchart for UE operation to support UE information on channel environments according to embodiments of the present disclosure.

FIG. 12 shows an example flowchart for UE operation to support UE information on channel environments according to embodiments of the present disclosure. FIG. 12 is an example of a method 1200 for operations at a UE to support AI/ML techniques for channel environment classification where the UE sends information on a particular channel environment. At operation 1201, the UE reports capability information to a BS, including the support of an ML approach for channel environment classification. At operation 1202, the UE receives configuration information from the BS, which can include ML-related configuration information such as enabling/disabling of an ML approach for channel environment classification, an ML model to be used, trained model parameters, and/or whether model parameter updates reported by the UE will be used or not; this information will be described below. Also, the UE may receive configuration information for the UE to send channel environment reports to the BS, which can contain the UL report channel format, resource, aperiodic/periodic/semi-persistent configuration, periodicity, etc., as presented later along with exemplary configuration IEs. At operation 1203, the UE performs model training, or receives model parameters from a network entity. In one embodiment, model training can be performed at the UE. Alternatively, model training can be performed at another network entity (e.g., the O-RAN defined RAN Intelligent Controller), and trained model parameters can be sent to the UE. In yet another embodiment, model training can be performed offline (e.g., model training is performed outside of the network), and the trained model parameters can be sent to the UE by the network entity, or may be stored inside the UE. At operation 1204, the UE sends information on a channel environment to the BS, which the UE may obtain through ML inference operations based on the ML model parameters. The message can work as a recommendation to the BS for making any operational decisions such as scheduling or any kinds of adaptation. In one example, information can consist of an index to a pre-defined lookup table of channel environments. In another example, information can consist of a value for the DL RS density in time and/or frequency. In yet another example, information can consist of a recommendation for handover to another BS, a recommendation for transmission mode, a recommendation for scheduled time/frequency resource, a recommendation for MIMO beamforming adjustment from the current served beams, etc., along with the feedback on the inferred channel environment classification.

As an operation example, a UE can be configured with possible categories for channel environment classification, and a method for classification. In order for the BS to have reasonable expectation on the performance of UE inference on the channel environment classification, the network can configure a UE with an AI/ML model and related parameters for channel environment classification. Alternatively, the performance of UE inference can be UE's own implementation without configuring AI/ML model and related parameters. In one example, UE's own implemented algorithm can be tested to be verified to meet a certain performance requirement.

In another embodiment, the framework for supporting AI/ML techniques for channel environment classification can include model training at a BS or a network entity or outside of the network (e.g., via offline training), and model inference operations at the BS or a network entity.

Figure 13:
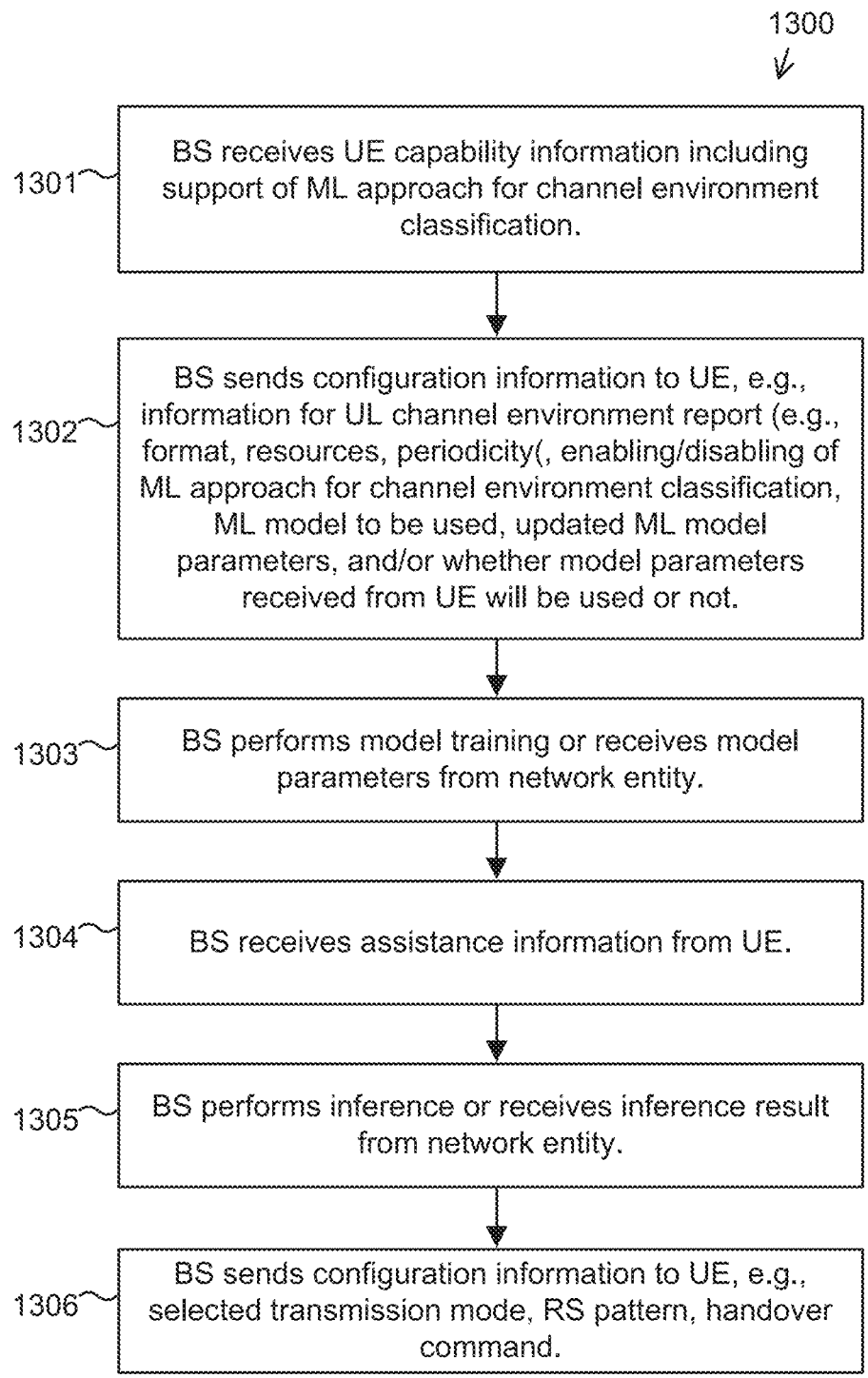
FIG. 13 shows an example flowchart for BS operation to support BS determination of channel environment according to embodiments of the present disclosure.

FIG. 13 shows an example flowchart for BS operation to support BS determination of channel environment according to embodiments of the present disclosure. FIG. 13 is an example of a method 1300 for operations at a BS to support AI/ML techniques for channel environment classification where the BS determines a particular channel environment. At operation 1301, the BS receives UE capability information from a UE, including the support of an ML approach for channel environment classification. At operation 1302, the BS sends configuration information to the UE, which can include ML-related configuration information such as enabling/disabling of an ML approach for channel environment classification, an ML model to be used, trained model parameters, and/or whether model parameter updates reported by the UE will be used or not; this information will be described below. At operation 1303, the BS performs model training, or receives model parameters from a network entity. In one embodiment, model training can be performed at the BS. Alternatively, model training can be performed at another network entity (e.g., the O-RAN defined RAN Intelligent Controller), and trained model parameters can be sent to the BS. In yet another embodiment, model training can be performed offline (e.g., model training is performed outside of the network), and the BS may receive the trained model parameters from a network entity or may have them stored in memory inside the BS. At operation 1304, the BS receives assistance information from the UE; the assistance information can include information to be used for model inference, which will be described below. At operation 1305, the BS performs model inference or receives a model inference result from a network entity. At operation 1306, the BS sends configuration information to the UE. In one example, a configuration message can include an index to a pre-defined lookup table for a transmission mode. In another example, a configuration message can include an index to a pre-defined lookup table for an RS pattern. In yet another example, information can consist of a BS handover command, a recommendation for transmission mode, a recommendation for scheduled time/frequency resource, a recommendation for MIMO beamforming adjustment from the current served beams, etc., along with the feedback on the inferred channel environment classification.

Figure 14:
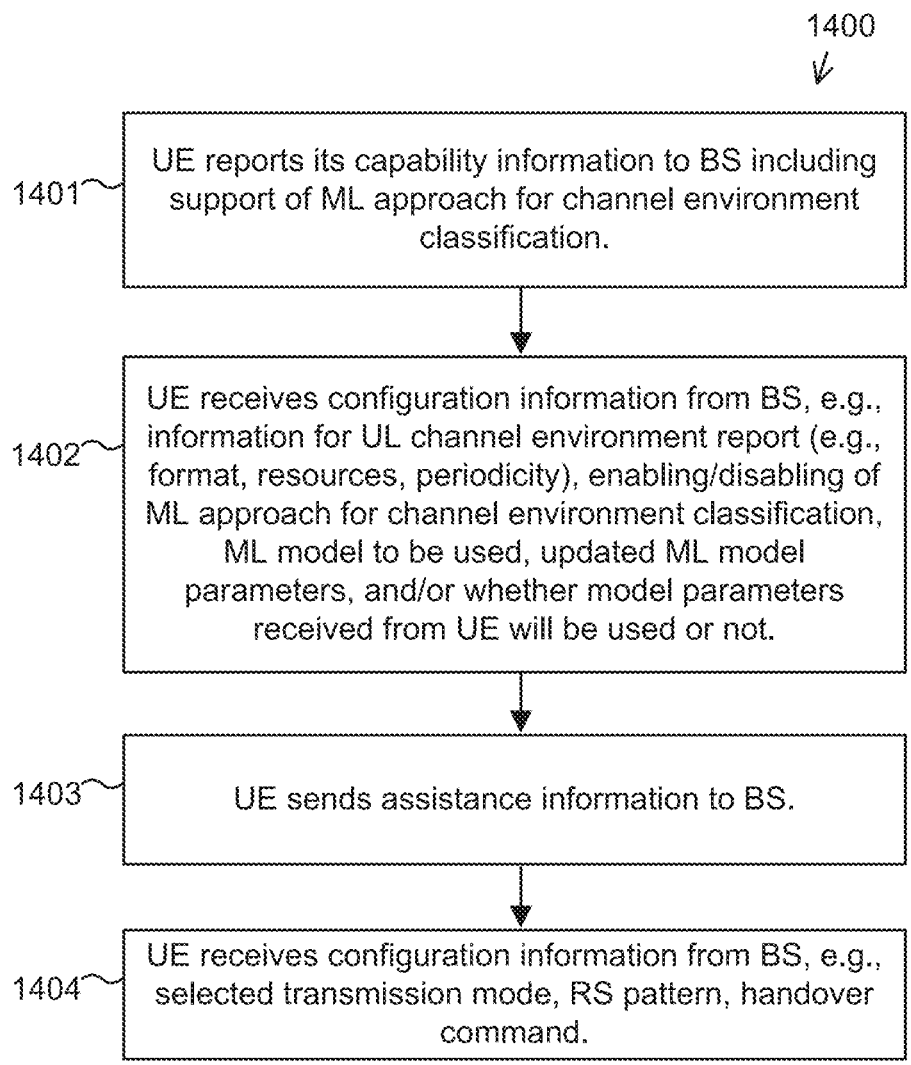
FIG. 14 shows an example flowchart for UE operation to support BS determination of channel environment according to embodiments of the present disclosure.

FIG. 14 shows an example flowchart for UE operation to support BS determination of channel environment according to embodiments of the present disclosure. FIG. 14 is an example of a method 1400 for operations at a UE to support AI/ML techniques for channel environment classification where a BS determines a particular channel environment. At operation 1401, the UE reports capability information to the BS, including the support of an ML approach for channel environment classification. At operation 1402, the UE receives configuration information from the BS, which can include ML-related configuration information such as enabling/disabling of an ML approach for channel environment classification, an ML model to be used, trained model parameters, and/or whether model parameter updates reported by the UE will be used or not; this information will be described below. At operation 1403, the UE sends assistance information to the BS; the assistance information can include information to be used for model inference, which will be described below. At operation 1404, the UE receives configuration information from the BS. In one example, a configuration message can include an index to a pre-defined lookup table for a transmission mode. In another example, a configuration message can include an index to a pre-defined lookup table for an RS pattern. In yet another example, information can consist of a BS handover command, a recommendation for transmission mode, a recommendation for scheduled time/frequency resource, a recommendation for MIMO beamforming adjustment from the current served beams, etc., along with the feedback on the inferred channel environment classification.

The index of an indicated channel environment can be used to retrieve a pre-defined channel environment from a lookup table. One example of a pre-defined channel environment is a "low-speed rural" environment, where the coherence time and the coherence bandwidth are both large. Another example of a pre-defined channel environment is a "high-speed urban" environment, where the coherence time and the coherence bandwidth are both small. The geographical characteristics, such as rural or urban, can be known by the network from the serving cell location or positioning method. In yet another example, the environmental attributes can be more specific to the given area. For instance, the environment can be elevation of UE in an urban area, UE mobility, multi-path delay spread, type of conveyance such as vehicle or high speed train, etc., and/or UE moving trajectory.

The UE channel environment can be reported via the PUCCH and/or the PUSCH. A new UCI type, a new PUCCH format and/or a new MAC CE can be defined for the UE channel environment report. The report can be based on an indexing of pre-configured category of channel environments along with other attributes related to the channel environment as exemplified earlier.

In one embodiment, the UE channel environment report can be triggered periodically, e.g., via UE-specific RRC signaling. In another embodiment, the UE channel environment report can be semi-persistent or aperiodic. For example, the UE channel environment report can be triggered by the DCI, where a new field (e.g., 1-bit triggering field) can be introduced to the DCI for report triggering. In one example, an IE similar to the CSI-ReportConfig IE can be introduced for configuring the UE channel environment report. In another embodiment, the report can be triggered only when there is an environmental change. For instance, after an initial report is made on the channel environment classification, the second and the following reports are sent if there is a change on the inferred channel environment from the previous report.

The capability of UE to determine channel environment can be integrated with various use cases, where the UE can be configured to take actions based on the channel environment and communicate that with BS. An example of the signaling for a specific use case of CSI feedback is explained in detail in the embodiment below.

The UE channel environment report can also include recommendations for particular use cases. One example of a recommendation is the DL RS pattern, e.g., the time/frequency density of DL RS. Another example of a recommendation is the DL transmission mode, e.g. spatial multiplexing, transmit diversity, etc. Yet another example of a recommendation concerns handover to another BS, a recommendation for transmission mode, a recommendation for scheduled time/frequency resource, a recommendation for MIMO beamforming adjustment from the current served beams, etc., along with the feedback on the inferred channel environment classification.

The BS can utilize the channel environment report, which can include recommendations for particular use cases, to adapt the BS' transmission and/or reception parameters. For example, the BS can increase the temporal density of DL RS if the coherence time of the channel decreases. In another example, the BS can switch the DL transmission mode from transmit diversity to spatial multiplexing if the coherence time and the coherence bandwidth of the channel increases. In yet another example, the BS can issue a BS handover command, change transmission mode, change time/frequency resource for scheduling, update MIMO beam directions, etc.

TABLE 4 provides an example of the IE for configuring the UE channel environment report, where whether the report is periodic or semi-persistent or aperiodic, the resources for the report transmission, and/or report contents can be included. For the 'Chan-Env', a set of UE channel environments is predefined in this example; the UE can report one of these channel environments via the index E1, E2, etc.

TABLE 4

An example of IE for configuration of UE channel environment report

```
ChEnvReport-ReportConfig ::=      SEQUENCE {
  reportConfigId                  ChEnvReport-ReportConfigId,
  reportConfigType                CHOICE {
    periodic                      SEQUENCE {
      reportSlotConfig            ChEnvReport-
          ReportPeriodicityAndOffset,
      pucch-ChEnvReport-ResourceList    SEQUENCE (SIZE
          (1..maxNrofBWPs))  OF  PUCCH-ChEnvReport-Resource
    },
    semiPersistentOnPUCCH         SEQUENCE {
      reportSlotConfig            ChEnvReport-
          ReportPeriodicityAndOffset,
      pucch-ChEnvReport-ResourceList         SEQUENCE (SIZE
          (1..maxNrofBWPs))  OF  PUCCH-ChEnvReport-Resource
    },
    semiPersistentOnPUSCH         SEQUENCE {
      reportSlotConfig                       ENUMERATED {sl5,
          sl10, sl20, sl40, sl80, sl160, sl320},
      reportSlotOffsetList                   SEQUENCE (SIZE (1..
          maxNrofUL-Allocations))  OF  INTEGER(0..32),
      p0alpha                     P0-PUSCH-AlphaSetId
    },
    aperiodic                     SEQUENCE {
      reportSlotOffsetList                   SEQUENCE (SIZE
          (1..maxNrofUL-Allocations)) OF INTEGER(0..32)
    }
  },
  reportQuantity                  CHOICE {
    none                          NULL,
    Chan-Env                      ENUMERATED {E1, E2, ...}
    ...
  },
ChEnvReport-ReportPeriodicityAndOffset ::=    CHOICE {
  slots4                          INTEGER(0..3),
  slots5                          INTEGER(0..4),
  slots8                          INTEGER(0..7),
  slots10                         INTEGER(0..9),
  slots16                         INTEGER(0..15),
  slots20                         INTEGER(0..19),
  slots40                         INTEGER(0..39),
  slots80                         INTEGER(0..79),
  slots160                        INTEGER(0..159),
  slots320                        INTEGER(0..319)
}
PUCCH-ChEnvReport-Resource ::=    SEQUENCE {
  uplinkBandwidthPartId           BWP-Id,
  pucch-Resource                  PUCCH-ResourceId
}
}
```

The UE assistance information report offers several advantages over relying on existing signaling. For example, a BS can use SRS to estimate the UL (and DL, depending on reciprocity) channel from a UE. The minimum periodicity of SRS is 2 milliseconds (ms), though; in contrast, the spacing between consecutive DMRS can be configured to be less than 1 ms. Thus, a UE can perform finer-grained measurements of the DL channel using received DMRS, compared to a BS measuring the UL channel using received SRS.

As another example, a UE can report local information that may not be available to a BS. A UE can use the UE's camera(s) to detect an oncoming vehicle that will cross the UE's line-of-sight with a BS in T seconds. A UE can then report this information to a BS and make a pre-emptive recommendation for a transmission mode switch in T seconds (e.g., switching to a relatively robust mode such as transmit diversity).

The UE assistance information related to AI/ML techniques for channel environment classification (e.g., at operations 1304, 1403) can include one or multiple of the following information available at the UE, e.g., through UE's estimation based on the DL signals: UE speed (or, similarly, Doppler spread), frequency selectivity (or, similarly, delay spread), channel coherence time, channel coherence bandwidth, UE trajectory, radio resource management (RRM) metrics, block error rate, throughput, UE acceleration, etc. The assistance information can be used for model inference, e.g., when inference is performed at the BS or a network entity. Alternatively, the assistance information can include the model inference result if inference is performed at the UE. For example, the UE can perform inference and obtain an inferred channel environment. In another example, the UE can perform inference and obtain an inferred transmission mode (e.g., switching to transmit diversity, switching to spatial multiplexing). As another example, the UE can perform inference and obtain an inferred BS handover recommendation.

The UE assistance information can be reported via the PUCCH and/or the PUSCH. A new UCI type, a new PUCCH format and/or a new MAC CE can be defined for the UE assistance information report.

Figure 15:
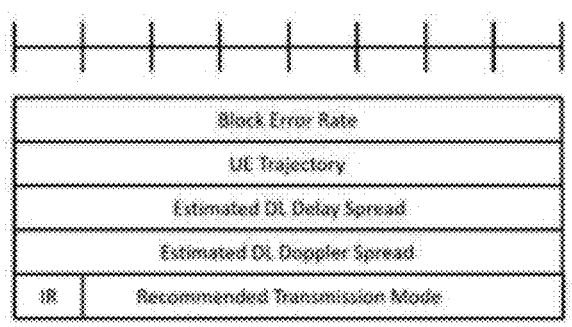
FIG. 15 depicts an example of a new MAC-CE for the UE assistance information report according to embodiments of the present disclosure.

FIG. 15 depicts an example of a new MAC-CE for the UE assistance information report according to embodiments of the present disclosure. FIG. 15 shows an example of a new MAC CE for the UE assistance information report, where the Block Error Rate, UE Trajectory, Estimated DL Delay Spread, and Estimated DL Doppler Spread fields each have a length of 8 bits; the Recommended Transmission Mode field has a length of 7 bits; and the IR field consists of a single bit that is set to 1 when the Recommended Transmission Mode field is present.

In one embodiment, the UE assistance information report can be triggered periodically, e.g., via UE-specific RRC signaling. In another embodiment, the UE assistance information report can be semi-persistent or aperiodic. For example, the UE assistance information report can be triggered by the DCI, where a new field (e.g., 1-bit triggering field) can be introduced to the DCI for report triggering. In one example, an IE similar to the CSI-ReportConfig IE can be introduced for configuring the UE assistance information report to support AI/ML techniques for channel environment classification.

TABLE 5 provides an example of the IE for configuring the UE assistance information report, where whether the report is periodic or semi-persistent or aperiodic, the resources for the report transmission, and/or report contents can be included. For the 'Coherence-bw', a set of coherence bandwidths are predefined in this example; the UE can report one of these coherence bandwidths via the index BW1, BW2, etc.

TABLE 5

An example of IE for configuration of UE assistance information report for support of AI/ML techniques for channel environment classification

```
MlChEnvReport-ReportConfig ::=           SEQUENCE {
    reportConfigId                              MlChEnvReport-
            ReportConfigId,
    reportConfigType                         CHOICE {
        periodic                                SEQUENCE {
            reportSlotConfig                        MlChEnvReport-
                    ReportPeriodicityAndOffset,
            pucch-MlChEnvReport-ResourceList        SEQUENCE (SIZE
                    (1..maxNrofBWPs))   OF   PUCCH-MlChEnvReport-
                    Resource
        },
        semiPersistentOnPUCCH                   SEQUENCE {
            reportSlotConfig                        MlChEnvReport-
                    ReportPeriodicityAndOffset,
            pucch-MlChEnvReport-ResourceList        SEQUENCE (SIZE
                    (1..maxNrofBWPs) )  OF   PUCCH-MlChEnvReport-
                    Resource
        },
        semiPersistentOnPUSCH                   SEQUENCE {
            reportSlotConfig                        ENUMERATED {sl5,
                sl10, sl20, sl40, sl80, sl160, sl320},
            reportSlotOffsetList                    SEQUENCE (SIZE (1..
                    maxNrofUL-Allocations)) OF INTEGER(0..32),
            p0alpha                                 P0-PUSCH-AlphaSetId
        },
        aperiodic                               SEQUENCE {
            reportSlotOffsetList                    SEQUENCE (SIZE
                (1..maxNrofUL-Allocations)) OF INTEGER(0..32)
        }
    },
    reportQuantity                           CHOICE {
        none                                    NULL,
        Coherence-bw                            ENUMERATED {BW1, BW2, ...}
        ...
    },
MlChEnvReport-ReportPeriodicityAndOffset ::= CHOICE {
    slots4                                   INTEGER(0..3),
    slots5                                   INTEGER(0..4),
    slots8                                   INTEGER(0..7),
    slots10                                  INTEGER(0..9),
    slots16                                  INTEGER(0..15),
    slots20                                  INTEGER(0..19),
    slots40                                  INTEGER(0..39),
    slots80                                  INTEGER(0..79),
    slots160                                 INTEGER(0..159),
    slots320                                 INTEGER(0..319)
}
PUCCH-mlChEnvReport-Resource :: =         SEQUENCE {
    uplinkBandwidthPartId                    BWP-Id,
    pucch-Resource                           PUCCH-ResourceId
}
}
```

In one embodiment, part of or all the configuration information for channel environment classification can be broadcast as part of cell-specific information, for example via system information such as MIB, SIB1 or other SIBs. Alternatively, a new SIB can be introduced for the indication of configuration information for channel environment classification. For example, the enabling/disabling of an ML approach, an ML model and/or model parameters for channel environment classification can be broadcast. TABLE 6 provides an example of sending the configuration information for channel environment classification via SIB1, where K classifiers are predefined and one classifier can be configured. In another example, updates of classifier parameters can be broadcast.

TABLE 6

An example of IE SIB1 modification for configuration of ML/AI techniques for channel environment classification

```
SIB1 ::=         SEQUENCE {
   cellselectionInfo                       SEQUENCE {
      q-RxLevMin                              Q-RxLevMin,
      q-RxLevMinOffset                           INTEGER (1..8)
            OPTIONAL,      -- Need S
      q-RxLevMinSUL                                 Q-RxLevMin
            OPTIONAL,      -- Need R
      q-QualMin                                     Q-QualMin
            OPTIONAL,      -- Need S
      q-QualMinOffset                          INTEGER (1..8)
            OPTIONAL       -- Need S
   }
            OPTIONAL,      -- Cond Standalone
   ...
   chan-env-classifier                       INTEGER (1..K)
   ...
   nonCriticalExtension                          SEQUENCE{ }
            OPTIONAL
}
```

In another embodiment, part of or all the configuration information for channel environment classification can be sent by UE-specific signaling. TABLE 7 provides an example of configuration for channel environment classification via the IE PDSCH-ServingCellConfig. In this example, the ML approach for channel environment classification is enabled or disabled via a BOOLEAN parameter, and the ML model/algorithm to be used is indicated via an index from 1 to K. In one example, the combination of an ML model and the parameters to be used for the model can be predefined, with each index from 1 to K corresponding to a certain ML model and a set of model parameters. Alternatively, one or multiple ML models/algorithms can be predefined, and a set of parameters in the IE can indicate the corresponding values for the model parameters.

TABLE 7

An example of IE PDSCH-ServingCellConfig modification for configuration of ML/AI techniques for channel environment classification (boldface indicates modification)

```
PDSCH-ServingCellConfig ::=          SEQUENCE {
   codeBlockGroupTransmission              SetupRelease { PDSCH-
         CodeBlockGroupTransmission }        OPTIONAL,  -- Need
         M
   xOverhead                               ENUMERATED { xOh6,
         xOh12, xOh18 }                       OPTIONAL,  --
         Need S
   ...,
   [[
   maxMIMO-Layers                           INTEGER (1. .8)
         OPTIONAL,  -- Need M
   processingType2Enabled                             BOOLEAN
         OPTIONAL     -- Need M
   ]],
   [[
   pdsch-CodeBlockGroupTransmissionList-rl6 SetupRelease   { PDSCH-
         CodeBlockGroupTransmissionList-rl6 }    OPTIONAL   --
         Need M
```

TABLE 7-continued

An example of IE PDSCH-ServingCellConfig modification for configuration of
ML/AI techniques for channel environment classification (boldface indicates modification)

```
]  ]
    processingType2Enabled                          BOOLEAN
            OPTIONAL    -- Need M
    pdsch-ChanEnvClass                 SEQUENCE {
        mlEnabled                      BOOLEAN
        mlAlgo                         INTEGER (1...K)
        ...
        }
}
```

In one embodiment, the framework for integrating the capability of UE to determine its channel environment with a use case is explained in detail for the example use case of CSI feedback. One of the key components of a MIMO transmission scheme is CSI acquisition at the base station or gNB. In FDD systems, the CSI is acquired using the CSI-RS transmission from gNB, and CSI calculation and feedback from mobile station or UE.

There have been various studies to reduce the CSI feedback overhead, i.e., the number of bits to report the CSI. In particular, algorithms that leverage the temporal correlation of channel for optimizing the channel estimation and/or CSI feedback benefit from being aware of the channel environment. The focus of this embodiment is on signaling required to enable this in the case where BS is aware of the capability of UE to support the determination of channel environment as described in main embodiments.

Figure 16:
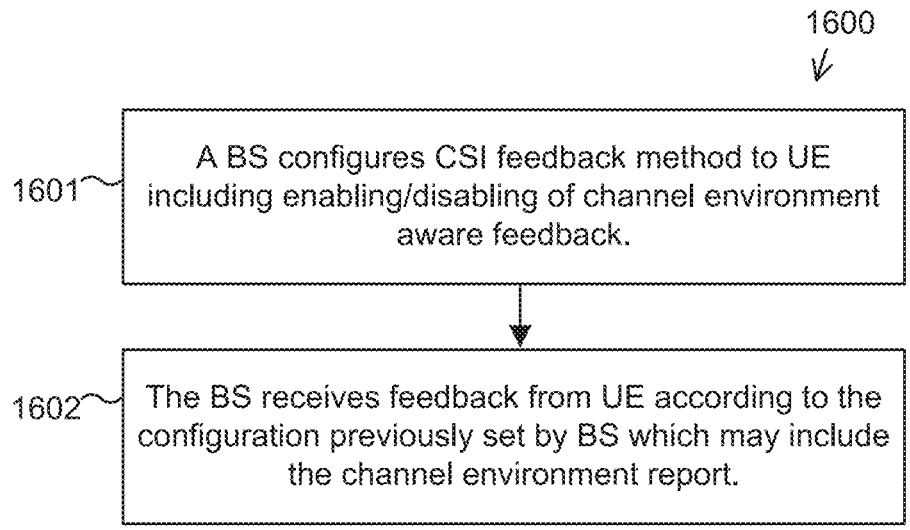
FIG. 16 shows an example flowchart for BS operation to support CSI feedback being aware of channel environment according to embodiments of the present disclosure.

FIG. 16 shows an example flowchart for BS operation to support CSI feedback being aware of channel environment according to embodiments of the present disclosure. FIG. 16 illustrates the example of method 1600, for integrating the determination of channel environment with CSI feedback mechanism. In operation 1601, BS sends the CSI-RS configuration information to the UE by CSI-Reportconfig IE during which in one embodiment where the inference for determination of channel environment happens at the UE, the CSI-Reportconfig IE may include an additional field chan-env-classifier as illustrated in TABLE 8 that configures a particular classifier from pre-determined set of K classifiers.

TABLE 8

An example of IE CSI-ReportConfig modification for configuration of channel
environment classification aware CSI feedback (boldface indicates modification)

```
CSI-ReportConfig : : =          SEQUENCE {
    reportConfigId                     CSI-ReportConfigId,
    carrier                            ServCellIndex OPTIONAL, --
            Need S
    resourcesForChannelMeasurement     CSI-ReportConfigId,
    csi-IM-ResourcesForInterference    CSI-ReportConfigId, OPTIONAL,
            -- Need R
    nzp-CSI-RS-ResourcesForInterference    CSI-ReportConfigId,
            OPTIONAL, -- Need R
    reportConfigType                   CHOICE {
        periodic                           SEQUENCE {
            reportSlotConfig                   CSI-
                    ReportPeriodicityAndOffset
            pucch-CSI-ResourceList             SEQUENCE {SIZE
                    (1..MAXNrofBWPs)) OF PUCCH-CSI-Resource
        },
        semiPersistentOnPUCCH              SEQUENCE {
            reportSlotConfig                   CSI-
                    ReportPeriodicityAndOffset,
            pucch-CSI-ResourceList             SEQUENCE {SIZE (1..
                    MAXNrofBWPs)) OF PUCCH-CSI-Resource
        },
        semiPersistentOnPUSCH              SEQUENCE {
            reportSlotConfig                   ENUMERATED {s15,
                    s110, s120, s140, s180, s1160, s1320},
            reportSlotOffsetList               SEQUENCE {SIZE
                    (1..MAXNrofUL-Allocations)) OF
                    INTEGER(0..32)
            p0alpha                            P0-PUSCH-AlphaSetId
        },
        aperiodic                          SEQUENCE {
            reportSlotOffsetList               SEQUENCE {SIZE
                    (1..MAXNrofUL-Allocations)) OF
                    INTEGER(0..32)
        },                                 CHOICE {
    reportQuantity
        none                               NULL,
        cri-RI-PMI-CQI                     NULL,
        cri-RI-i1                          NULL,
        cri-RI-i1-CQI                      SEQUENCE {
```

TABLE 8-continued

An example of IE CSI-ReportConfig modification for configuration of channel environment classification aware CSI feedback (boldface indicates modification)

| | |
|---|---|
|     pdsch-BundleSizeForCSI<br>        -- Need S | ENUMERATED {n2, n4} OPTIONAL, |
|   }, | |
|   cri-RI-CQI | NULL, |
|   cri-RSRP | NULL, |
|   ssb-Index-RSRP | NULL, |
|   cri-RI-LI-PMI-CQI | NULL |
| }, | |
| chan-env-classifier | INTEGER (1..K) |

In yet another embodiment where inference happens at the BS, the CSI-Reportconfig IE may include an additional field chan-env-result as illustrated in TABLE 9 that conveys the inference result to the UE. In operation 1602, BS receives the CSI feedback report determined by the UE based on the particular channel environment. In the case where inference for determination of channel environment happens at UE, this CSI feedback will include the channel environment classification information.

TABLE 9

An example of IE CSI-ReportConfig modification for configuration of channel environment classification aware CSI feedback (boldface indicates modification)

```
CSI-ReportConfig :: =        SEQUENCE {
  reportConfigId             CSI-ReportConfigId,
  carrier                    ServCellIndex OPTIONAL, --
        Need S
  resourcesForChannelMeasurement    CSI-ReportConfigId,
  csi-IM-ResourcesForInterference   CSI-ReportConfigId, OPTIONAL,
        -- Need R
  nzp-CSI-RS-ResourcesForInterference   CSI-ReportConfigId,
        OPTIONAL, -- Need R
  reportConfigType           CHOICE {
    periodic                 SEQUENCE {
      reportSlotConfig               CSI-
            ReportPeriodicityAndOffset
      pucch-CSI-ResourceList         SEQUENCE {SIZE
          (1..MAXNrofBWPs)) OF PUCCH-CSI-Resource
    },
    semiPersistentOnPUCCH    SEQUENCE {
      reportSlotConfig               CSI-
            ReportPeriodicityAndOffset,
      pucch-CSI-ResourceList         SEQUENCE {SIZE (1..
          MAXNrofBWPs)) OF PUCCH-CSI-Resource
    },
    semiPersistentOnPUSCH    SEQUENCE {
      reportSlotConfig               ENUMERATED {s15,
          s110, s120, s140, s180, s1160, s1320},
      reportSlotOffsetList           SEQUENCE {SIZE
          (1..MAXNrofUL-Allocations)) OF
          INTEGER(0..32)
      p0alpha                  P0-PUSCH-AlphaSetId
    },
    aperiodic                SEQUENCE {
      reportSlotOffsetList           SEQUENCE {SIZE
          (1..MAXNrofUL-Allocations)) OF
          INTEGER(0..32)
    },
  reportQuantity       CHOICE {
    none                       NULL,
    cri-RI-PMI-CQI             NULL,
    cri-RI-i1                  NULL,
    cri-RI-iI-CQI              SEQUENCE {
      pdsch-BundleSizeForCSI         ENUMERATED {n2, n4} OPTIONAL,
          -- Need S
    },
    cri-RI-CQI                 NULL,
    cri-RSRP                   NULL,
```

TABLE 9-continued

An example of IE CSI-ReportConfig modification for configuration of channel environment classification aware CSI feedback (boldface indicates modification)

| | |
|---|---|
| ssb-Index-RSRP | NULL, |
| cri-RI-LI-PMI-CQI | NULL |
| }, | |
| chan-env-result | INTEGER |

Figure 17:
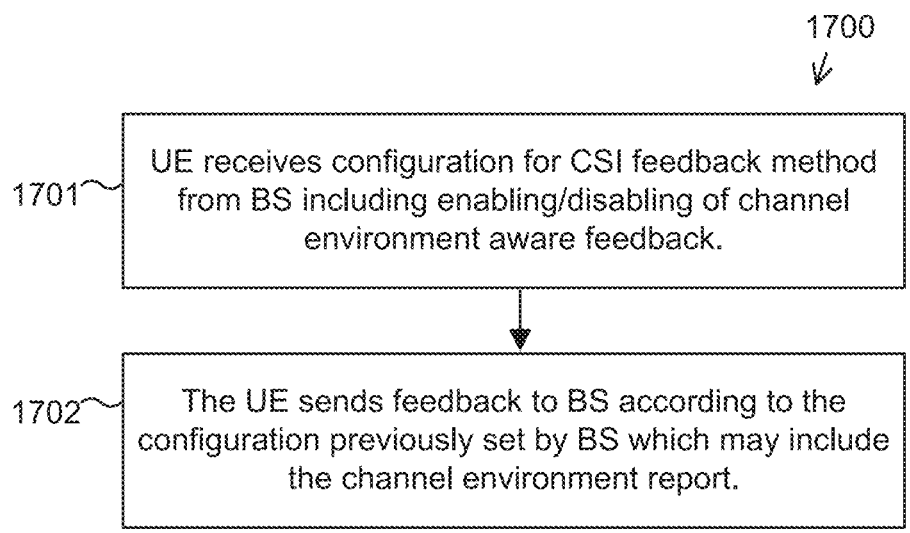
FIG. 17 shows an example flowchart for UE operation to support CSI feedback being aware of channel environment according to embodiments of the present disclosure.

FIG. 17 shows an example flowchart for UE operation to support CSI feedback being aware of channel environment according to embodiments of the present disclosure. FIG. 17 illustrates an example of method 1700 for integrating the determination of channel environment with CSI feedback mechanism. In operation 1701, UE receives the CSI-RS configuration information from the BS during which in one embodiment where the inference for determination of channel environment happens at the UE, the CSI-Reportconfig IE may include an additional field chan-env-classifier as illustrated in TABLE 8 that configures a particular classifier from pre-determined set of K classifiers. In yet another embodiment where inference happens at the BS, the CSI-Reportconfig IE may include an additional field chan-env-result as illustrated in TABLE 9 that conveys the inference result to the UE. In operation 1702, UE sends the CSI feedback report determined to the BS based on the particular channel environment. In one embodiment, UE might use different AI/ML models for different channel environments or in another embodiment UE might use different algorithms. In the case where inference for determination of channel environment happens at UE, this CSI feedback will include the channel environment classification information.

Although this disclosure has been described with an exemplary embodiment, various changes and modifications may be suggested to one skilled in the art. It is intended that this disclosure encompass such changes and modifications as fall within the scope of the appended claims.

What is claimed is:

1. A user equipment (UE), comprising:
a processor; and
a transceiver operatively coupled to the processor, the transceiver configured to
transmit a report of UE capability for support of machine-learning (ML) based channel environment classification based on Doppler spread and delay spread, wherein the channel environment classification classifies the Doppler spread and the delay spread for a channel environment of a channel between the UE and a base station based on one or more of UE speed, UE trajectory, frequency selectivity, coherence bandwidth, coherence time, radio resource management (RRM) metrics, block error rate, throughput, or UE acceleration, and
receive configuration for ML based channel environment classification based on Doppler spread and delay spread, the configuration for ML based channel environment classification based on Doppler spread and delay spread comprising at least enabling/disabling of ML based channel environment classification based on Doppler spread and delay spread,
wherein, when ML based channel environment classification based on Doppler spread and delay spread is enabled, the transceiver is configured to one of transmit UE assistance information for ML based channel environment classification based on Doppler spread and delay spread, or transmit an indication of the channel environment.

2. The user equipment of claim 1, wherein the indication of the channel environment is a pre-defined channel environment associated with a lookup table.

3. The user equipment of claim 1, wherein the configuration for ML based channel environment classification based on Doppler spread and delay spread further comprises one or more of a format for the indication, resources for the indication, periodicity of the indication, ML model to be used, updated ML model parameters, or whether model parameters received from the UE will be used.

4. The user equipment of claim 1, wherein the UE assistance information comprises one of
an indication of one or more of UE speed, frequency selectivity, channel coherence time, channel coherence bandwidth, UE trajectory, radio resource management (RRM) metrics, block error rate, throughput, or UE acceleration, or
an indication usable for performing model inference or includes model inference result if the UE performs model inference, wherein the model inference result further comprises one or more of an indication of a channel environment, a recommendation for a transmission mode, or a recommendation for handover by a base station (BS).

5. The user equipment of claim 1, wherein the UE assistance information comprises one of
periodic and triggered by UE-specific radio resource control (RRC) signaling, or
aperiodic or semi-persistent and triggered by a downlink control information (DCI).

6. The user equipment of claim 1, wherein the configuration for ML based channel environment classification based on Doppler spread and delay spread may be one of
broadcast as part of system information, or
transmitted via UE-specific signaling.

7. The user equipment of claim 1, wherein the configuration for ML based channel environment classification based on Doppler spread and delay spread includes enabling/disabling of channel environment-aware feedback, and wherein the transceiver is configured to transmit channel state information (CSI) reporting indicating channel environment when channel environment-aware feedback is enabled.

8. A method performed by a user equipment (UE), comprising:
transmitting a report of UE capability for support of machine-learning (ML) based channel environment classification based on Doppler spread and delay spread, wherein the channel environment classification classifies the Doppler spread and the delay spread for a channel environment of a channel between the UE and a base station based on one or more of UE speed, UE trajectory, frequency selectivity, coherence bandwidth, coherence time, radio resource management (RRM) metrics, block error rate, throughput, or UE acceleration;

receiving configuration for ML based channel environment classification based on Doppler spread and delay spread, the configuration for ML based channel environment classification based on Doppler spread and delay spread comprising at least enabling/disabling of ML based channel environment classification based on Doppler spread and delay spread; and when ML based channel environment classification based on Doppler spread and delay spread is enabled, one of transmitting UE assistance information for ML based channel environment classification based on Doppler spread and delay spread, or transmitting an indication of channel environment.

9. The method of claim 8, wherein the indication of channel environment is a pre-defined channel environment associated with a lookup table.

10. The method of claim 8, wherein the configuration for ML based channel environment classification based on Doppler spread and delay spread further comprises one or more of a format for the indication, resources for the indication, periodicity of the indication, ML model to be used, updated ML model parameters, or whether model parameters received from the UE will be used.

11. The method of claim 8, wherein the UE assistance information comprises one of comprises an indication of one or more of UE speed, frequency selectivity, channel coherence time, channel coherence bandwidth, UE trajectory, radio resource management (RRM) metrics, block error rate, throughput, or UE acceleration, or information usable for performing model inference or includes model inference result if the UE performs model inference, wherein the model inference result further comprises one or more of an indication of a channel environment, a recommendation for a transmission mode, or a recommendation for handover by a base station (BS).

12. The method of claim 8, wherein the UE assistance information comprises one of periodic and triggered by UE-specific radio resource control (RRC) signaling, or aperiodic or semi-persistent and triggered by a downlink control information (DCI).

13. The method of claim 8, wherein the configuration for ML based channel environment classification based on Doppler spread and Doppler delay may be one of broadcast as part of system information, or transmitted via UE-specific signaling.

14. The method of claim 8, wherein the configuration for ML based channel environment classification based on Doppler spread and delay spread includes enabling/disabling of channel environment-aware feedback, and wherein the method further comprises:

transmitting channel state information (CSI) reporting indicating channel environment when channel environment-aware feedback is enabled.

* * * * *